United States Patent
Biemer

(10) Patent No.: US 12,086,884 B1
(45) Date of Patent: *Sep. 10, 2024

(54) INSURANCE SYSTEM FOR ANALYSIS OF AUTONOMOUS DRIVING

(71) Applicant: Allstate Insurance Company, Northbrook, IL (US)

(72) Inventor: Edward A. Biemer, Glencoe, IL (US)

(73) Assignee: ALLSTATE INSURANCE COMPANY, Northbrook, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/130,813

(22) Filed: Dec. 22, 2020

Related U.S. Application Data

(63) Continuation of application No. 15/890,701, filed on Feb. 7, 2018, now Pat. No. 10,956,983, which is a continuation of application No. 14/184,272, filed on Feb. 19, 2014, now Pat. No. 9,940,676.

(51) Int. Cl.
G06Q 40/08 (2012.01)
(52) U.S. Cl.
CPC .................. G06Q 40/08 (2013.01)
(58) Field of Classification Search
CPC .............. G06Q 40/00; G06Q 40/08
USPC ......................... 705/35, 36 R, 38
See application file for complete search history.

(56) References Cited

U.S. PATENT DOCUMENTS

| | | |
|---|---|---|
| 83,960 A | 11/1868 | Heator |
| 4,119,166 A | 10/1978 | Ayotte et al. |
| 4,622,636 A | 11/1986 | Tachibana |
| 4,706,072 A | 11/1987 | Ikeyama |
| 4,926,336 A | 5/1990 | Yamada |
| 5,053,964 A | 10/1991 | Mister et al. |
| 5,270,708 A | 12/1993 | Kamishima |
| 5,295,551 A | 3/1994 | Sukonick |
| 5,430,432 A | 7/1995 | Camhi et al. |
| 5,465,079 A | 11/1995 | Bouchard et al. |
| 5,475,387 A | 12/1995 | Matsumoto |

(Continued)

FOREIGN PATENT DOCUMENTS

| | | |
|---|---|---|
| CN | 101131588 A | 2/2008 |
| DE | 102010001006 A1 | 7/2011 |

(Continued)

OTHER PUBLICATIONS

Dec. 30, 2020—(US) Notice of Allowance—U.S. Appl. No. 15/974,861.

(Continued)

*Primary Examiner* — Kirsten S Apple
(74) *Attorney, Agent, or Firm* — Polsinelli PC

(57) ABSTRACT

System and methods are disclosed for determining properties of vehicle insurance policies for vehicles that engage in autonomous driving. Vehicle driving data, an autonomous driving system quality rating, and/or other information may be used to determine, for example, a premium, a deductible, a coverage term, and/or a coverage amount of an automobile insurance policy of an automobile that engages in autonomous driving. In addition, vehicle driving data and/or other information may be used to determine a distance-based autonomous driving insurance factor based at least in part on a distance traveled by the vehicle while the vehicle was engaged in autonomous driving.

20 Claims, 5 Drawing Sheets

(56) References Cited

U.S. PATENT DOCUMENTS

| | | | |
|---|---|---|---|
| 5,572,449 A | 11/1996 | Tang et al. | |
| 5,680,122 A | 10/1997 | Mio | |
| 5,710,565 A | 1/1998 | Shirai et al. | |
| 5,797,134 A | 8/1998 | McMillan et al. | |
| 5,848,373 A | 12/1998 | DeLorme et al. | |
| 6,026,345 A | 2/2000 | Shah et al. | |
| 6,060,989 A | 5/2000 | Gehlot | |
| 6,064,970 A | 5/2000 | McMillan et al. | |
| 6,116,369 A | 9/2000 | King et al. | |
| 6,128,559 A | 10/2000 | Saitou et al. | |
| 6,186,793 B1 | 2/2001 | Brubaker | |
| 6,188,950 B1 | 2/2001 | Tsutsumi et al. | |
| 6,265,978 B1 | 7/2001 | Atlas | |
| 6,301,530 B1 | 10/2001 | Tamura | |
| 6,366,207 B1 | 4/2002 | Murphy | |
| 6,389,351 B1 | 5/2002 | Egawa et al. | |
| 6,415,226 B1 | 7/2002 | Kozak | |
| 6,502,020 B2 | 12/2002 | Lang | |
| 6,502,035 B2 | 12/2002 | Levine | |
| 6,647,328 B2 | 11/2003 | Walker | |
| 6,675,094 B2 | 1/2004 | Russell et al. | |
| 6,707,378 B2 | 3/2004 | MacNeille et al. | |
| 6,732,024 B2 | 5/2004 | Wilhelm Rekow et al. | |
| 6,780,077 B2 | 8/2004 | Baumgartner et al. | |
| 6,868,386 B1 | 3/2005 | Henderson et al. | |
| 6,931,309 B2 | 8/2005 | Phelan et al. | |
| 6,982,635 B2 | 1/2006 | Obradovich | |
| 7,054,831 B2 | 5/2006 | Koenig | |
| 7,116,248 B2 | 10/2006 | Lu et al. | |
| 7,133,771 B1 | 11/2006 | Nesbitt | |
| 7,186,199 B1 | 3/2007 | Baxter, Jr. | |
| 7,242,112 B2 | 7/2007 | Wolf et al. | |
| 7,286,825 B2 | 10/2007 | Shishido et al. | |
| 7,304,589 B2 | 12/2007 | Kagawa | |
| 7,315,239 B2 | 1/2008 | Cheng et al. | |
| 7,339,483 B1 | 3/2008 | Farmer | |
| 7,353,111 B2 | 4/2008 | Takahashi et al. | |
| 7,356,516 B2 * | 4/2008 | Richey | G06Q 30/0253 705/16 |
| 7,366,892 B2 | 4/2008 | Spaur et al. | |
| 7,389,198 B1 | 6/2008 | Dimitriadis | |
| 7,546,206 B1 | 6/2009 | Miller et al. | |
| 7,610,210 B2 | 10/2009 | Helitzer et al. | |
| 7,644,019 B2 | 1/2010 | Woda et al. | |
| 7,650,211 B2 | 1/2010 | Wang et al. | |
| 7,657,370 B2 | 2/2010 | Nagase et al. | |
| 7,657,441 B2 * | 2/2010 | Richey | G06Q 20/403 705/30 |
| 7,660,725 B2 | 2/2010 | Wahlbin et al. | |
| 7,664,589 B2 | 2/2010 | Etori et al. | |
| 7,739,087 B2 | 6/2010 | Qiu | |
| 7,805,321 B2 | 9/2010 | Wahlbin et al. | |
| 7,818,187 B2 | 10/2010 | Wahlbin et al. | |
| 7,821,421 B2 | 10/2010 | Tamir et al. | |
| 7,822,384 B2 | 10/2010 | Anschutz et al. | |
| 7,937,278 B1 | 5/2011 | Cripe et al. | |
| 7,966,118 B2 | 6/2011 | Kade | |
| 7,991,629 B2 | 8/2011 | Gay et al. | |
| 8,031,062 B2 | 10/2011 | Smith | |
| 8,065,169 B1 | 11/2011 | Oldham et al. | |
| 8,078,349 B1 | 12/2011 | Prada Gomez et al. | |
| 8,078,382 B2 | 12/2011 | Sugano et al. | |
| 8,086,523 B1 | 12/2011 | Palmer | |
| 8,090,598 B2 | 1/2012 | Bauer et al. | |
| 8,108,083 B2 | 1/2012 | Kameyama | |
| 8,139,109 B2 | 3/2012 | Schmiedel et al. | |
| 8,145,393 B2 | 3/2012 | Foster et al. | |
| 8,152,589 B2 | 4/2012 | Bowen et al. | |
| 8,160,809 B2 | 4/2012 | Farwell et al. | |
| 8,180,655 B1 | 5/2012 | Hopkins, III | |
| 8,195,394 B1 | 6/2012 | Zhu et al. | |
| 8,204,666 B2 | 6/2012 | Takeuchi et al. | |
| 8,229,618 B2 | 7/2012 | Tolstedt et al. | |
| 8,280,308 B2 | 10/2012 | Anschutz et al. | |
| 8,280,752 B1 | 10/2012 | Cripe et al. | |
| 8,290,701 B2 | 10/2012 | Mason et al. | |
| 8,314,718 B2 | 11/2012 | Muthaiah et al. | |
| 8,326,473 B2 | 12/2012 | Simpson et al. | |
| 8,335,607 B2 | 12/2012 | Gatten et al. | |
| 8,352,112 B2 | 1/2013 | Mudalige | |
| 8,407,139 B1 | 3/2013 | Palmer | |
| 8,457,827 B1 | 6/2013 | Ferguson et al. | |
| 8,457,892 B2 | 6/2013 | Aso et al. | |
| 8,538,785 B2 | 9/2013 | Coleman et al. | |
| 8,549,318 B2 | 10/2013 | White et al. | |
| 8,554,468 B1 | 10/2013 | Bullock | |
| 8,566,126 B1 | 10/2013 | Hopkins, III | |
| 8,577,703 B2 | 11/2013 | McClellan et al. | |
| 8,595,037 B1 | 11/2013 | Hyde et al. | |
| 8,606,512 B1 | 12/2013 | Bogovich et al. | |
| 8,620,575 B2 | 12/2013 | Vogt et al. | |
| 8,620,693 B1 | 12/2013 | Schumann, Jr. | |
| 8,630,795 B2 | 1/2014 | Breed et al. | |
| 8,639,535 B1 | 1/2014 | Kazenas | |
| 8,659,436 B2 | 2/2014 | Ngo | |
| 8,676,466 B2 | 3/2014 | Mudalige | |
| 8,686,844 B1 | 4/2014 | Wine | |
| 8,718,861 B1 | 5/2014 | Montemerlo et al. | |
| 8,725,311 B1 | 5/2014 | Breed | |
| 8,750,306 B2 | 6/2014 | Yousefi et al. | |
| 8,757,309 B2 | 6/2014 | Schmitt et al. | |
| 8,781,669 B1 | 7/2014 | Teller et al. | |
| 8,798,841 B1 | 8/2014 | Nickolaou et al. | |
| 8,799,036 B1 | 8/2014 | Christensen et al. | |
| 8,812,330 B1 | 8/2014 | Cripe et al. | |
| 8,818,725 B2 | 8/2014 | Ricci | |
| 8,930,269 B2 | 1/2015 | He et al. | |
| 8,949,016 B1 | 2/2015 | Ferguson et al. | |
| 8,954,226 B1 | 2/2015 | Binion et al. | |
| 8,996,303 B1 | 3/2015 | Bogovich et al. | |
| 9,020,751 B1 | 4/2015 | Bogovich et al. | |
| 9,046,374 B2 | 6/2015 | Ricci | |
| 9,063,543 B2 | 6/2015 | An et al. | |
| 9,079,587 B1 | 7/2015 | Rupp et al. | |
| 9,141,582 B1 | 9/2015 | Brinkmann et al. | |
| 9,188,985 B1 | 11/2015 | Hobbs et al. | |
| 9,216,737 B1 | 12/2015 | Zhu et al. | |
| 9,262,787 B2 | 2/2016 | Binion et al. | |
| 9,330,571 B2 | 5/2016 | Ferguson et al. | |
| 9,338,607 B2 | 5/2016 | Takehara et al. | |
| 9,355,423 B1 | 5/2016 | Slusar | |
| 9,355,546 B2 | 5/2016 | Kim et al. | |
| 9,373,149 B2 | 6/2016 | Abhyanker | |
| 9,384,148 B2 | 7/2016 | Muttik et al. | |
| 9,390,451 B1 | 7/2016 | Slusar | |
| 9,433,843 B2 | 9/2016 | Morlock | |
| 9,457,814 B2 | 10/2016 | Kim et al. | |
| 9,495,874 B1 | 11/2016 | Zhu et al. | |
| 9,605,970 B1 | 3/2017 | Day et al. | |
| 9,618,359 B2 | 4/2017 | Weast et al. | |
| 9,648,107 B1 | 5/2017 | Penilla et al. | |
| 9,679,487 B1 | 6/2017 | Hayward | |
| 9,691,298 B1 | 6/2017 | Hsu-Hoffman et al. | |
| 9,715,711 B1 | 7/2017 | Konrardy et al. | |
| 9,739,627 B1 | 8/2017 | Chintakindi | |
| 9,758,039 B2 | 9/2017 | Hannon | |
| 9,765,516 B2 | 9/2017 | Van Dinther et al. | |
| 9,767,516 B1 | 9/2017 | Konrardy et al. | |
| 9,792,656 B1 | 10/2017 | Konrardy et al. | |
| 9,801,580 B2 | 10/2017 | Iizuka et al. | |
| 9,851,214 B1 | 12/2017 | Chintakindi | |
| 9,858,621 B1 | 1/2018 | Konrardy et al. | |
| 9,865,019 B2 | 1/2018 | Bogovich et al. | |
| 9,870,649 B1 | 1/2018 | Fields et al. | |
| 9,904,289 B1 | 2/2018 | Hayward | |
| 9,904,900 B2 | 2/2018 | Cao | |
| 9,922,374 B1 | 3/2018 | Vose et al. | |
| 9,928,432 B1 | 3/2018 | Sathyanarayana et al. | |
| 9,931,062 B2 | 4/2018 | Cavallaro et al. | |
| 9,932,033 B2 | 4/2018 | Slusar et al. | |
| 9,940,676 B1 | 4/2018 | Biemer | |
| 9,940,834 B1 | 4/2018 | Konrardy et al. | |
| 9,946,334 B2 | 4/2018 | Pala et al. | |
| 9,953,300 B2 | 4/2018 | Connor | |

(56) References Cited

U.S. PATENT DOCUMENTS

| | | |
|---|---|---|
| 9,972,054 B1 | 5/2018 | Konrardy et al. |
| 10,012,510 B2 | 7/2018 | Denaro |
| 10,037,578 B2 | 7/2018 | Bogovich et al. |
| 10,037,580 B2 | 7/2018 | Bogovich et al. |
| 10,046,618 B2 | 8/2018 | Kirsch et al. |
| 10,078,871 B2 | 9/2018 | Sanchez et al. |
| 10,096,038 B2 | 10/2018 | Ramirez et al. |
| 10,127,737 B1 | 11/2018 | Manzella et al. |
| 10,157,422 B2 | 12/2018 | Jordan Peters et al. |
| 10,657,597 B1 * | 5/2020 | Billman ............ G06Q 40/08 |
| 10,783,586 B1 | 9/2020 | Augustine et al. |
| 10,796,369 B1 | 10/2020 | Augustine et al. |
| 10,803,525 B1 | 10/2020 | Augustine et al. |
| 10,956,983 B1 | 3/2021 | Biemer |
| 2001/0020902 A1 | 9/2001 | Tamura |
| 2001/0020903 A1 | 9/2001 | Wang |
| 2001/0039509 A1 | 11/2001 | Dar et al. |
| 2002/0022920 A1 | 2/2002 | Straub |
| 2002/0024464 A1 | 2/2002 | Kovell et al. |
| 2002/0095249 A1 | 7/2002 | Lang |
| 2002/0111725 A1 | 8/2002 | Burge |
| 2002/0111738 A1 | 8/2002 | Iwami et al. |
| 2002/0120396 A1 | 8/2002 | Boies et al. |
| 2002/0128882 A1 | 9/2002 | Nakagawa et al. |
| 2002/0178033 A1 | 11/2002 | Yoshioka et al. |
| 2003/0043045 A1 | 3/2003 | Yasushi et al. |
| 2003/0088489 A1 | 5/2003 | Peters et al. |
| 2003/0128107 A1 | 7/2003 | Wilkerson |
| 2003/0182165 A1 | 9/2003 | Kato et al. |
| 2003/0187704 A1 | 10/2003 | Hashiguchi et al. |
| 2004/0021583 A1 | 2/2004 | Lau et al. |
| 2004/0036601 A1 | 2/2004 | Obradovich |
| 2004/0054452 A1 | 3/2004 | Bjorkman |
| 2004/0068555 A1 | 4/2004 | Satou |
| 2004/0098464 A1 | 5/2004 | Koch et al. |
| 2004/0103006 A1 | 5/2004 | Wahlbin et al. |
| 2004/0103010 A1 | 5/2004 | Wahlbin et al. |
| 2004/0128613 A1 | 7/2004 | Sinisi |
| 2004/0142678 A1 | 7/2004 | Krasner |
| 2004/0153362 A1 | 8/2004 | Bauer et al. |
| 2004/0236476 A1 | 11/2004 | Chowdhary |
| 2004/0254698 A1 | 12/2004 | Hubbard et al. |
| 2004/0260579 A1 | 12/2004 | Tremiti |
| 2005/0091175 A9 | 4/2005 | Farmer |
| 2005/0107951 A1 | 5/2005 | Brulle-Drews et al. |
| 2005/0137757 A1 | 6/2005 | Phelan et al. |
| 2005/0174217 A1 | 8/2005 | Basir et al. |
| 2005/0228622 A1 | 10/2005 | Jacobi |
| 2005/0256638 A1 | 11/2005 | Takahashi et al. |
| 2005/0264404 A1 | 12/2005 | Franczyk et al. |
| 2005/0273263 A1 | 12/2005 | Egami et al. |
| 2005/0283503 A1 | 12/2005 | Hancock et al. |
| 2005/0288046 A1 | 12/2005 | Zhao et al. |
| 2006/0006990 A1 | 1/2006 | Obradovich |
| 2006/0053038 A1 | 3/2006 | Warren et al. |
| 2006/0055565 A1 | 3/2006 | Kawamata et al. |
| 2006/0095301 A1 | 5/2006 | Gay |
| 2006/0129313 A1 | 6/2006 | Becker et al. |
| 2006/0129445 A1 | 6/2006 | McCallum |
| 2006/0161341 A1 | 7/2006 | Haegebarth et al. |
| 2006/0184321 A1 | 8/2006 | Kawakami et al. |
| 2006/0206623 A1 | 9/2006 | Gipps et al. |
| 2006/0221328 A1 | 10/2006 | Rouly |
| 2006/0247852 A1 | 11/2006 | Kortge et al. |
| 2006/0253307 A1 | 11/2006 | Warren et al. |
| 2007/0021910 A1 | 1/2007 | Iwami et al. |
| 2007/0027583 A1 | 2/2007 | Tamir et al. |
| 2007/0027726 A1 | 2/2007 | Warren et al. |
| 2007/0032929 A1 | 2/2007 | Yoshioka et al. |
| 2007/0136107 A1 | 6/2007 | Maguire et al. |
| 2007/0167147 A1 | 7/2007 | Krasner et al. |
| 2007/0182532 A1 | 8/2007 | Lengning et al. |
| 2007/0216521 A1 | 9/2007 | Guensler et al. |
| 2007/0256499 A1 | 11/2007 | Pelecanos et al. |
| 2007/0257815 A1 | 11/2007 | Gunderson et al. |
| 2007/0282638 A1 | 12/2007 | Surovy |
| 2008/0004802 A1 | 1/2008 | Horvitz |
| 2008/0013789 A1 | 1/2008 | Shima et al. |
| 2008/0033637 A1 | 2/2008 | Kuhlman et al. |
| 2008/0059007 A1 | 3/2008 | Whittaker et al. |
| 2008/0059351 A1 * | 3/2008 | Richey ............ G06Q 20/20 705/35 |
| 2008/0091309 A1 | 4/2008 | Walker |
| 2008/0091490 A1 | 4/2008 | Abrahams et al. |
| 2008/0114542 A1 | 5/2008 | Nambata et al. |
| 2008/0148409 A1 | 6/2008 | Ampunan et al. |
| 2008/0161987 A1 | 7/2008 | Breed |
| 2008/0167757 A1 | 7/2008 | Kanevsky et al. |
| 2008/0243558 A1 | 10/2008 | Gupte |
| 2008/0258890 A1 | 10/2008 | Follmer et al. |
| 2008/0288406 A1 | 11/2008 | Seguin et al. |
| 2008/0319602 A1 | 12/2008 | McClellan et al. |
| 2009/0012703 A1 | 1/2009 | Aso et al. |
| 2009/0024419 A1 | 1/2009 | McClellan et al. |
| 2009/0063201 A1 | 3/2009 | Nowotarski et al. |
| 2009/0079839 A1 | 3/2009 | Fischer et al. |
| 2009/0115638 A1 | 5/2009 | Shankwitz et al. |
| 2009/0140887 A1 | 6/2009 | Breed et al. |
| 2009/0312945 A1 | 12/2009 | Sakamoto et al. |
| 2010/0023183 A1 | 1/2010 | Huang et al. |
| 2010/0030586 A1 | 2/2010 | Taylor et al. |
| 2010/0042314 A1 | 2/2010 | Vogt et al. |
| 2010/0131300 A1 | 5/2010 | Collopy et al. |
| 2010/0131303 A1 | 5/2010 | Collopy et al. |
| 2010/0131304 A1 | 5/2010 | Collopy et al. |
| 2010/0131307 A1 | 5/2010 | Collopy et al. |
| 2010/0138244 A1 | 6/2010 | Basir |
| 2010/0211270 A1 | 8/2010 | Chin et al. |
| 2010/0238009 A1 | 9/2010 | Cook et al. |
| 2010/0250087 A1 | 9/2010 | Sauter |
| 2010/0256852 A1 | 10/2010 | Mudalige |
| 2010/0280751 A1 | 11/2010 | Breed |
| 2010/0302371 A1 | 12/2010 | Abrams |
| 2010/0324775 A1 | 12/2010 | Kermani et al. |
| 2010/0332131 A1 | 12/2010 | Horvitz et al. |
| 2011/0029170 A1 | 2/2011 | Hyde et al. |
| 2011/0043350 A1 | 2/2011 | Ben David |
| 2011/0071718 A1 | 3/2011 | Norris et al. |
| 2011/0077028 A1 | 3/2011 | Wilkes, III et al. |
| 2011/0161119 A1 | 6/2011 | Collins |
| 2011/0173015 A1 | 7/2011 | Chapman et al. |
| 2011/0202305 A1 | 8/2011 | Willis et al. |
| 2011/0210867 A1 | 9/2011 | Benedikt |
| 2012/0034876 A1 | 2/2012 | Nakamura et al. |
| 2012/0053808 A1 | 3/2012 | Arai et al. |
| 2012/0072243 A1 | 3/2012 | Collins et al. |
| 2012/0083960 A1 | 4/2012 | Zhu et al. |
| 2012/0101660 A1 | 4/2012 | Hattori |
| 2012/0109418 A1 | 5/2012 | Lorber |
| 2012/0123641 A1 | 5/2012 | Ferrin et al. |
| 2012/0123806 A1 | 5/2012 | Schumann, Jr. et al. |
| 2012/0173290 A1 | 7/2012 | Collins et al. |
| 2012/0197669 A1 | 8/2012 | Kote et al. |
| 2012/0209505 A1 | 8/2012 | Breed et al. |
| 2012/0290146 A1 | 11/2012 | Dedes et al. |
| 2012/0295592 A1 | 11/2012 | Peirce |
| 2013/0006469 A1 | 1/2013 | Green et al. |
| 2013/0006674 A1 | 1/2013 | Bowne et al. |
| 2013/0006675 A1 | 1/2013 | Bowne et al. |
| 2013/0013179 A1 | 1/2013 | Lection et al. |
| 2013/0018549 A1 | 1/2013 | Kobana et al. |
| 2013/0030606 A1 | 1/2013 | Mudalige et al. |
| 2013/0037650 A1 | 2/2013 | Heppe |
| 2013/0046559 A1 | 2/2013 | Coleman et al. |
| 2013/0052614 A1 | 2/2013 | Mollicone et al. |
| 2013/0066511 A1 | 3/2013 | Switkes et al. |
| 2013/0073321 A1 * | 3/2013 | Hofmann ............ G06Q 10/10 705/4 |
| 2013/0090821 A1 | 4/2013 | Abboud et al. |
| 2013/0116920 A1 | 5/2013 | Cavalcante et al. |
| 2013/0131905 A1 | 5/2013 | Green et al. |
| 2013/0131906 A1 | 5/2013 | Green et al. |
| 2013/0144657 A1 | 6/2013 | Ricci |
| 2013/0147638 A1 | 6/2013 | Ricci |

(56) References Cited

U.S. PATENT DOCUMENTS

| | | |
|---|---|---|
| 2013/0158821 A1 | 6/2013 | Ricci |
| 2013/0166325 A1* | 6/2013 | Ganapathy ............ G06Q 40/08 705/4 |
| 2013/0179198 A1 | 7/2013 | Bowne et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204645 A1 | 8/2013 | Lehman et al. |
| 2013/0212659 A1 | 8/2013 | Maher et al. |
| 2013/0218603 A1 | 8/2013 | Hagelstein et al. |
| 2013/0218604 A1 | 8/2013 | Hagelstein et al. |
| 2013/0226441 A1 | 8/2013 | Horita |
| 2013/0250933 A1 | 9/2013 | Yousefi et al. |
| 2013/0253809 A1 | 9/2013 | Jones et al. |
| 2013/0261944 A1 | 10/2013 | Koshizen |
| 2013/0297097 A1 | 11/2013 | Fischer et al. |
| 2013/0304513 A1 | 11/2013 | Hyde et al. |
| 2013/0304514 A1* | 11/2013 | Hyde ..................... G06Q 40/08 705/4 |
| 2013/0311002 A1 | 11/2013 | Isaac |
| 2014/0037938 A1 | 2/2014 | Li et al. |
| 2014/0074512 A1 | 3/2014 | Hare et al. |
| 2014/0080098 A1 | 3/2014 | Price |
| 2014/0088855 A1 | 3/2014 | Ferguson |
| 2014/0108058 A1 | 4/2014 | Bourne et al. |
| 2014/0113619 A1 | 4/2014 | Tibbitts et al. |
| 2014/0136414 A1 | 5/2014 | Abhyanker |
| 2014/0139341 A1 | 5/2014 | Green et al. |
| 2014/0156133 A1 | 6/2014 | Cullinane et al. |
| 2014/0156134 A1 | 6/2014 | Cullinane et al. |
| 2014/0172221 A1 | 6/2014 | Solyom et al. |
| 2014/0172290 A1 | 6/2014 | Prokhorov et al. |
| 2014/0180723 A1 | 6/2014 | Cote et al. |
| 2014/0210644 A1 | 7/2014 | Breed |
| 2014/0257869 A1 | 9/2014 | Binion et al. |
| 2014/0257871 A1* | 9/2014 | Christensen .......... G06Q 40/08 705/4 |
| 2014/0257873 A1 | 9/2014 | Hayward et al. |
| 2014/0266795 A1 | 9/2014 | Tseng et al. |
| 2014/0272810 A1 | 9/2014 | Fields et al. |
| 2014/0276090 A1 | 9/2014 | Breed |
| 2014/0278586 A1 | 9/2014 | Sanchez et al. |
| 2014/0300458 A1 | 10/2014 | Bennett |
| 2014/0300494 A1 | 10/2014 | Tseng et al. |
| 2014/0303827 A1 | 10/2014 | Dolgov et al. |
| 2014/0310075 A1 | 10/2014 | Ricci |
| 2014/0310186 A1 | 10/2014 | Ricci |
| 2014/0333468 A1 | 11/2014 | Zhu et al. |
| 2014/0335902 A1 | 11/2014 | Guba et al. |
| 2014/0350970 A1 | 11/2014 | Schumann, Jr. et al. |
| 2014/0358413 A1 | 12/2014 | Trombley et al. |
| 2014/0379384 A1 | 12/2014 | Duncan et al. |
| 2014/0379385 A1 | 12/2014 | Duncan et al. |
| 2014/0380264 A1 | 12/2014 | Misra et al. |
| 2015/0019266 A1 | 1/2015 | Stempora |
| 2015/0025917 A1 | 1/2015 | Stempora |
| 2015/0057931 A1 | 2/2015 | Pivonka |
| 2015/0081404 A1 | 3/2015 | Basir |
| 2015/0088334 A1 | 3/2015 | Bowers et al. |
| 2015/0088550 A1 | 3/2015 | Bowers et al. |
| 2015/0112543 A1 | 4/2015 | Binion et al. |
| 2015/0112730 A1 | 4/2015 | Binion et al. |
| 2015/0112731 A1 | 4/2015 | Binion et al. |
| 2015/0112733 A1 | 4/2015 | Baker et al. |
| 2015/0120124 A1 | 4/2015 | Bartels et al. |
| 2015/0134181 A1 | 5/2015 | Ollis |
| 2015/0142244 A1 | 5/2015 | You et al. |
| 2015/0149017 A1 | 5/2015 | Attard et al. |
| 2015/0149019 A1 | 5/2015 | Pilutti et al. |
| 2015/0158486 A1 | 6/2015 | Healey et al. |
| 2015/0161738 A1 | 6/2015 | Stempora |
| 2015/0166059 A1 | 6/2015 | Ko |
| 2015/0166062 A1 | 6/2015 | Johnson et al. |
| 2015/0166069 A1 | 6/2015 | Engelman et al. |
| 2015/0170287 A1 | 6/2015 | Tirone et al. |
| 2015/0175168 A1 | 6/2015 | Hoye et al. |
| 2015/0179062 A1 | 6/2015 | Ralston et al. |
| 2015/0187013 A1 | 7/2015 | Adams et al. |
| 2015/0187014 A1 | 7/2015 | Adams et al. |
| 2015/0187015 A1 | 7/2015 | Adams et al. |
| 2015/0187019 A1* | 7/2015 | Fernandes ............. G06Q 40/08 705/4 |
| 2015/0194055 A1 | 7/2015 | Maass |
| 2015/0217763 A1 | 8/2015 | Reichel et al. |
| 2015/0241878 A1 | 8/2015 | Crombez et al. |
| 2015/0242953 A1 | 8/2015 | Suiter |
| 2015/0248131 A1 | 9/2015 | Fairfield et al. |
| 2015/0254955 A1 | 9/2015 | Fields et al. |
| 2015/0266455 A1 | 9/2015 | Wilson |
| 2015/0294422 A1 | 10/2015 | Carver et al. |
| 2016/0009291 A1 | 1/2016 | Pallett et al. |
| 2016/0036558 A1 | 2/2016 | Ibrahim et al. |
| 2016/0065116 A1 | 3/2016 | Conger |
| 2016/0086285 A1 | 3/2016 | Jordan Peters et al. |
| 2016/0086393 A1 | 3/2016 | Collins et al. |
| 2016/0089954 A1 | 3/2016 | Rojas Villanueva |
| 2016/0090097 A1 | 3/2016 | Grube et al. |
| 2016/0096531 A1 | 4/2016 | Hoye et al. |
| 2016/0163198 A1 | 6/2016 | Dougherty |
| 2016/0167652 A1 | 6/2016 | Slusar |
| 2016/0189303 A1 | 6/2016 | Fuchs |
| 2017/0011465 A1 | 1/2017 | Anastassov et al. |
| 2017/0021764 A1 | 1/2017 | Adams et al. |
| 2017/0120929 A1 | 5/2017 | Siddiqui et al. |
| 2017/0154636 A1 | 6/2017 | Geiger et al. |
| 2017/0210288 A1 | 7/2017 | Briggs et al. |
| 2017/0219364 A1 | 8/2017 | Lathrop et al. |
| 2017/0221149 A1 | 8/2017 | Hsu-Hoffman et al. |
| 2017/0255966 A1 | 9/2017 | Khoury |
| 2018/0037635 A1 | 2/2018 | Grimm et al. |
| 2018/0202822 A1 | 7/2018 | DeLizio |
| 2018/0251128 A1 | 9/2018 | Penilla et al. |
| 2018/0376357 A1 | 12/2018 | Tavares Coutinho et al. |
| 2019/0101649 A1 | 4/2019 | Jensen |

FOREIGN PATENT DOCUMENTS

| | | |
|---|---|---|
| EP | 1296305 A1 | 3/2003 |
| EP | 2293255 A1 | 3/2011 |
| EP | 2471694 A2 | 7/2012 |
| EP | 2293255 B1 | 6/2016 |
| EP | 3303083 A1 | 4/2018 |
| NO | 2012150591 A2 | 11/2012 |
| WO | 2001039090 A1 | 5/2001 |
| WO | 2005108928 A1 | 11/2005 |
| WO | 2007102405 A1 | 9/2007 |
| WO | 2008067872 A1 | 6/2008 |
| WO | 2008096376 A1 | 8/2008 |
| WO | 2012014042 A2 | 2/2012 |
| WO | 2013012926 A1 | 1/2013 |
| WO | 2013126582 A1 | 8/2013 |
| WO | 2013160908 A2 | 10/2013 |
| WO | 2014148975 A1 | 9/2014 |
| WO | 2016028228 A1 | 2/2016 |
| WO | 2016122881 A1 | 8/2016 |
| WO | 2016200762 A1 | 12/2016 |

OTHER PUBLICATIONS

Feb. 10, 2021—(US) Notice of Allowance—U.S. Appl. No. 16/021,678.
Jan. 22, 2021—(US) Notice of Allowance—U.S. Appl. No. 15/890,701.
Xu, Qing et al., "Vehicle-to-Vehicle Safety Messaging in DSRC"; 2004.
EE Herald webpage, "DSRC Packet Sniffer, a vehicle-to-vehicle communication technology is under demo"; www.eeherald.com/section/news/nw10000198.html; dated Nov. 22, 2008.
Bai, Fan et al., "Reliability Analysis of DSRC Wireless Communication for Vehicle Safety"; Sep. 2006.
Kotani, Kazuya et al., "Inter-Vehicle Communication Protocol for Cooperatively Capturing and Sharing" Intersection Video; date unkown but believed to be before 2011.

(56) References Cited

OTHER PUBLICATIONS

BC Technology Webpage; "CarCom Intercom System"; www.bctechnologyltd.co.uk/clarson-intercom-system-brochure.htm; downloaded May 29, 2013.
Wolf Intercom webpage; "Wolf Intercom Systems"; http://wolfintercom.com/; downloaded May 29, 2013.
Telephonics Webpage; "Integrated Communication Systems Wired & Wireless Secure Intercommunications"; www.telephonics.com/netcom.asp; downloaded May 29, 2013.
Car-to-Car webpage; "Car-2-Car Communication"; www.car-to-car.org/index.php?id=8; downloaded May 29, 2013.
Cohda Wireless webpage; www.cohdawireless.com/default.html; downloaded May 29, 2013.
Eichler, Stephen et al., "Car-to-Car Communication" dated Oct. 2006.
Oki Webpage "OKI Develops World's First DSRC Inter-vehicle Communication Attachment for Mobile Phones to Help Pedestrian Safety" dated Jan. 8, 2009.
Zeng, X., Yin, K., and GE, H., "Hazardous Driving Prediction System," Submission to The Connected Vehicle Technology Challenge, Sep. 24, 2014, 20 pages.
Jan. 15, 2015 (US) Non-Final Office Action—U.S. Appl. No. 14/163,761.
Jan. 21, 2015 (US) Non-Final Office Action—U.S. Appl. No. 14/163,719.
Quad City Intersection Traffic Accident Study, Davenport-Rock Island-Moline Urbanized Area 1993 data, Bi-State Regional Commission, Mar. 1996; http://ntl.bts.gov/lib/000/300/338/00338.pdf; 78 pages; downloaded Apr. 8, 2008.
Geographic Information Systems Using CODES Linked Data (Crash Outcome Data Evaluation System), U.S. Department of Transportation National Highway Traffic Safety Administration, Apr. 2001; http://ntl.bts.gov/ib/11000/11100/11149/809-201.pdf; 44 pages; downloaded Apr. 8, 2008.
Final Report: What Value May Geographic Information Systems Add to the Art of Identifying Crash Countermeasures? John S. Miller, Senior Research Scientist, Virginia Transportation Research Council, Charlottesville, Virginia, Apr. 1999; http://www.virginiadot.org/vtrc/main/online_reports/pdf/99-r13.pdf, 44 pages; downloaded Apr. 8, 2008.
Mapping the Streets of the World, Hilmar Schmundt, Speigel Online, May 12, 2006 03:37 PM, High Technology; http://www.spiegel.de/international/spiegel/0,1518,druck-415848,00.html; 2 pages; downloaded Jun. 25, 2008.
Patents: At the forefront of technological innovation, Printed from the Teleatlas.com website, 2007; http://www.teleatlas.com/WhyTeleAtlas/Innovation/Patents/index.htm; 1 page; downloaded Jun. 25, 2008.
Digital Collection—Metadata View; Quad City Intersection Traffic Accident Study: 1993 Data; http://ntlsearch.bts.gov/tris/record/ntl/338.html; 2 pages; downloaded Jun. 25, 2008.
Advanced Tracking Technologies, Inc., Shadow Tracker Prov5 Track Detail Map, http://www.advantrack.com/map_pro_3.htm; 1 page; downloaded Jun. 25, 2008.
Advanced Tracking Technologies, Inc.; Track Playback; http://www.advantrack.com/Animated-Track-Playback.htm; 1 page; downloaded Jun. 25, 2008.
What is Geocoding?, http://www.trpc.org/programs/gis/geocode.htm; 5 pages; downloaded Jun. 25, 2008.
Logistics, Not Consumers, Best Early Market for Premium Traffic Information, Sep. 25, 2006; http://auto.ihs.com/news/2006/abi-premium-traffic.htm; 2 pages; downloaded Jun. 25, 2008.
Property/Casualty Insurance Gaining Position With Technology; Telematics, the use of Wireless communications and Global Positioning System (GPS) tracking, may soon change the way automobile insurance, both personal and commercial, is priced. Individual rating of a driver, to supplement class rating, now appears to be feasible .; http://www.towersperrin.com/TILLINGHAST/publications/publications/emphasis/Emphasis_2005_3/Holderedge.pdf, 4 pages; downloaded Apr. 8, 2008.

IVOX's Driver Score; Personal Lines; Benefits to using IVOX DriverScore; http://www.ivosdata.com/personal_lines.html; 1 page; downloaded Jul. 25, 2008.
Group1 Software; Point-Level Geocoding Option Geocoding Enrichment Solution; http://www.g1.com/PDF/Product/PointLevelGeocode.pdf; 2 pages; downloaded Apr. 8, 2008.
Integrated Enterprise Geo-Spatial Technology—Insurance Risk Examples by Brady Foust, Ph.D., Howard Botts, Ph.D. and Margaret Miller, Ph.D., Jan. 27, 2006; http://www.directionsmag.com/printer.php?article_id-2081; 2 pages; downloaded Jun. 25, 2008.
How the Discounts Work; www.SaveAsYouDrive.com; http://www.saveasyouddrive.com/page.asp?pageid=34& print=true; 2 pages; downloaded Jun. 25, 2008.
Jan. 29, 2016 (US) Notice of Allowance and Fee(s) Due—U.S. Appl. No. 14/163,741.
Mar. 17, 2016 (US) Notice of Allowance and Fee(s) Due—U.S. Appl. No. 14/163,761.
Apr. 7, 2016 (US) Non-Final Office Action—U.S. Appl. No. 14/163,719.
Mar. 18, 2016 (WO) International Search Report and Written Opinion—App PCT/US2016/013204.
Aug. 31, 2016 (WO) International Search Report—App PCT/US2016/036136.
Wardzinski, Dynamic risk assessment in autonomous vehicles motion planning, IEEE, 1st International Conference on Information Technology, Gdansk, May 18-21, 2008 [retrieved on Jul. 16, 2025], Retrieved from the Internet, <URL:http://kio.pg.gda.pl/lag/download/2008-IEEE%20ICIS-Dynamic%20Risk%20Assessment.pdf>, 4 pages.
Sep. 9, 2016 (US) Notice of Allowance—U.S. Appl. No. 14/163,719.
Sep. 9, 2016 (US) Non-Final Office Action—U.S. Appl. No. 14/697,131.
Sep. 9, 2016 (US) Non-Final Office Action—U.S. Appl. No. 14/697,141.
Sep. 9, 2016 (US) Non-Final Office Action—U.S. Appl. No. 14/697,153.
Oct. 6, 2016 (US) Non-Final Office Action—U.S. Appl. No. 14/184,272.
Oct. 3, 2016 (US) Non-Final Office Action—U.S. Appl. No. 14/733,576.
Oct. 20, 2016 (US) Non-Final Office Action—U.S. Appl. No. 14/816,336.
Oct. 21, 2016 (US) Non-Final Office Action—U.S. Appl. No. 14/862,266.
Oct. 24, 2016 (US) Non-Final Office Action—U.S. Appl. No. 14/816,299.
Oct. 17, 2016 (US) Office Action—U.S. Appl. No. 13/892,598.
Nov. 29, 2016 (US) Non-Final Office—U.S. Appl. No. 14/458,796.
Dec. 12, 2016 (US) Notice of Allowance—U.S. Appl. No. 14/832,197.
Dec. 19, 2016 (US) Final Office Action—U.S. Appl. No. 14/607,433.
Dec. 29, 2016 (US) Non-Final Office Action—U.S. Appl. No. 14/458,764.
Jan. 4, 2017 (US) Non-Final Office Action—U.S. Appl. No. 14/697,131.
Kurian, Bonny, "Auto-Insurance—Driving into the sunset?", Tala Consultancy Services, 2013.
O'Brien, Christine, "Autonomous Vehicle Technology: Consideration for the Auto Insurance Industry", University Transportation Resource Center (The 2nd Connected Vehicles Symposium, Rutgers University), Jun. 17, 2013.
Anderson, James M. et al., "Autonomous Vehicle Program: A Guide for Policymakers", Rand Corporation: Transportation, Space, and Technology Program, 2014.
Marchant, Gary E. et al., "The Coming Collision Between Autonomous Vehicles and the Liability System", Santa Clara Law Review (vol. 52: No. 4 (Article 6)), Dec. 17, 2012.
"The Munix Advantage", AUMA, retrieved Apr. 8, 2014, <http://www.auma.ca/live/digitalAssets/71/71248_MUNIX_onepager.pdf>.
"The Use of Occupation and Education Factors in Automobile Insurance", State of New Jersey: Department of Banking and Insurance, Apr. 2008.
"Preliminary Statement of Policy Concerning Automated Vehicles", National Highway Traffic Safety Administration, retrieved Jun. 9, 2014.
Walker Smith, Bryant, "Summary of levels of Driving Automation for On-Road Vehicles", Stanford Law School: The Center for Internet and Society, Dec. 18, 2013, <http://cyberlaw.stanford.edu/blog/2013/12/sae-levels-driving-automation>.

(56) References Cited

OTHER PUBLICATIONS

Auto Insurance Discounts, Liberty Mutual Insurance, downloaded from http://www.libertymutual.com/auto-insurance/auto-insurance-coverage/auto-insurance-discounts, Jan. 8, 2014, 2 pages.

Autonomous Vehicles Regulations, California Department of Motor Vehicles, 2011, downloaded from www.dmv.ca.gov/vr/autonomous/auto.htm, Jan. 2, 2014, 3 pages.

Sharma, Aroma, Autonomous Vehicle Conf Recap 2012: "Driving the Future: The Legal Implications of Autonomous Vehicles," High Tech Law Institute, downloaded from law.scu.edu/hightech/autonomousvehicleconfrecap2012/, Jan. 2, 2014, 7 pages.

Strumpf, Dan, "Corporate News: Driverless Cars Face Issues of Liability", Strumpf Dan, The Wall Street Journal Asia [Hong Kong] Jan. 29, 2013: 19, downloaded from http://search.proquest.com.ezproxy, Jan. 8, 2014, 2 pages.

Lienert, Anita, Drivers Would Opt for Autonomous Cars To Save on Insurance, Study Finds: Published: Nov. 7, 2013, downloaded from www.edmunds.com/car-news/drivers-would-opt-for-autonomous-cars-to-save-on-insurance-study-finds.html on Jan. 2, 2014, 6 pages.

Neumann, Peter G. and Contributors, "Risks to the Public," ACM SIGSOFT Software Engineering Notes, Jul. 2012 vol. 37 No. 4, pp. 20-29.

Kirkpatrick, Keith, "Legal issues with Robots," Communications of the ACM, Nov. 2013, vol. 56 no. 11, pp. 17-19.

Ingolfo, Silvia, and Silva Souza, Vitor E., "Law and Adaptivity in Requirements Engineering," SEAMS 2013, pp. 163-168.

O'donnell, Anthony, "Prepare for Deep Auto Insurance Premium Drop Scenario, Celent Report Advises," Insurance & Technology, May 8, 2012, downloaded from http://www.insurancetech.com/claims/prepare-for-deep-auto-insurance-premium/232901645?printer_friendly=this-page, Jan. 9, 2014, 3 pages.

Top issues: An annual report "The insurance industry in 2013; Strategy: Reshaping auto insurance", vol. 5, 2013, 6 pages.

O'Donnell, Anthony, "Rapid Emergence of Driverless Cars Demands Creation of Legal Infrastructure, Stanford Scholar Says," Insurance & Technology—Online, Jan. 3, 2013, downloaded from http: I I search.proquest.com .ezproxy.apollolibrary.com/ docview / 12 66 314 720 /fulltext/ 142 DA8916CC2 E861A14/ 11 ?accountid = 3 5812, Jan. 8, 2014, 2 pages.

"Self-driving cars: The next revolution" (kpmg.com | cargroup.org), 2012, 36 pages.

The autonomous car: The road to driverless driving, May 30, 2013, downloaded from analysis.telematicsupdate.com/v2x-safety/autonomous-car-road-driverless-driving on Jan. 2, 2014, 6 pages.

Ruquet, Mark E., "Who Insures a Driverless Car"? Property & Casualty 360, Oct. 1, 2012, downloaded from http:// search.proquest.com on Jan. 8, 2014, 2 pages.

Neil, Dan, "Who's Behind the Wheel? Nobody. The driverless car is coming. And we all should be glad it is," Wall Street Journal (Online) [New York, N.Y] Sep. 24, 2012, downloaded from http:/ /search.proquest.com on Jan. 8, 2014, 4 pages.

Bylund, Anders, "Would You Buy a Self-Driving Car to Save 80% on Auto Insurance?" The Motley Fool, Nov. 27, 2013, http://www.dailyfinance.com/2013/11/27/would-you-buy-a-self-driving-car-to-save-80-on-car/, 2 pages.

Litman, Todd, "Autonomous Vehicle Implementation Predictions Implications for Transport Planning," Victoria Transport Policy Institute, Dec. 23, 2013, 19 pages.

Light, Donald, "A Scenario: The End of Auto Insurance," May 8, 2012, downloaded Nov. 11, 2013 from ww.celent.com/reports/scenario-end-auto-insurance, 2 pages.

"Driver Assistance Systems," Robert Bosch GmbH, downloaded Oct. 27, 2013 from www.bosch-automotivetechnology.us/en_us/us/driving_comfort_1/driving_comfort_systems_for_passenger_cars_2/driver_assistance_systems_5/driver_assistan . . . 12 pages.

"Autonomous Car," Wikipedia, the free encyclopedia, downloaded Nov. 11, 2013 from en.wikipedia.org/wiki/Autonomous_car#cite_ref-28, 20 pages.

"Schlaue Autos von A bis Z." Encyclopedia, downloaded Oct. 27, 2013 from www.bester-beifahrer.de/startseite/lexikon/, 15 pages.

"Chassis Systems Control, Adaptive Cruise Control: More comfortable driving," Robert Bosch GmbH, Brochure downloaded Oct. 26, 2013, 4 pages.

"Get Ready for Automated Cars," Houston Chronicle, Sep. 11, 2012, downloaded Nov. 11, 2013, 1 page.

Levy, Steven, Salmon, Felix, Stokes, Jon, "Artificial Intelligence is Here. In Fact, It's All Around US. But It's Nothing Like We Expected," Jan. 2011, 14 pages.

"Driverless cars study: 1 in 5 would let computers do the driving," Nov. 4, 2013, downloaded Dec. 19, 2013 from http://www.carinsurance.com/press/driverless-cars-survey-results.aspx, 2 pages.

Shladover, Steven E. "What if Cars Could Drive Themselves," ACCESS Magazine, University of California Transportation Center, UC Berkeley, Apr. 1, 2000, downloaded Dec. 19, 2013, 7 pages.

Kim, Mun Hyun, Dickerson, Julie, Kosko, Bart, "Fuzzy throttle and brake control for platoons of smart cars," University of Southern California, Received May 1995, revised Aug. 1995, downloaded Dec. 19, 2013, 26 pages.

"A velocity control strategy for vehicular collision avoidance system," Abstract downloaded on May 9, 2013 from ieeexplore.ieee.org/xpl/articleDetails.jsp?tp=&arnumber=1626838&contentType=Conference+Publications&queryText%3DA+velocity+control+strategy+for . . . , 1 page.

"Fuzzy system representation of car-following phenomena," Abstract downloaded on May 9, 2013 from ieeexplore.ieee.org/xpl/articleDetails.jsp?tp=&arnumber=527798&contentType=Conference+Publications&queryText%3DFuzzy+system+representation+of . . . , 1 page.

"Direct adaptive longitudinal control of vehicle platoons," Abstract downloaded on May 9, 2013 from ieeexplore.ieee.org/xpl/articleDetails.jsp?tp=&arnumber-917908&contentType=Journals+%26+Magazines&queryText%3DDirect+adaptive+longitudinal+c . . . , 1 page.

Sharma, Devansh, "Development of Leader-Follower Robot in IIT Bombay," 4 pages, retrieved May 30, 2013, date unknown, but prior to the filing date of this application.

Noguchi, Noboru, Will, Jeff, Reid, Joh, and Zhang, Qin, "Development of a master-slave robot system for farm operations," Computers and Electronics in Agriculture 44 (2004), 19 pages.

"Project SARTRE (Safe Road Trains for the Environment)," Road Traffic Technology, downloaded on May 9, 2013 from www.roadtraffic-technology.com/projects/the-sartre-project/, 3 pages.

"A semi-autonomous tractor in an intelligent master-slave vehicle system," Oct. 2010, vol. 3, Issue 4, pp. 263-269, downloaded Dec. 19, 2013 from http://link.springer.com/article/10.1007%2Fs11370-010-0071-6, 4 pages.

"Development of an intelligent master-slave system between agricultural vehicles," Abstract downloaded on Dec. 19, 2013 from http://ieeexplore.ieee.org/xpl/login.jsp?tp=&arnumber=5548056&url=http%3A%2F%2Fi . . . , 1 page.

"A leader-follower formation flight control scheme for UAV helicopters," Abstract downloaded on Dec. 19, 2013 from http://ieeexplore.ieee.org/xpl/login.jsp?tp=&arnumber=4636116&url=http%3A%2F%2Fi . . . , 1 page.

VentureBeat.com webpage; "Cisco and NXP encourage car communication to make driving safer" www.venturebeat.com/2013/01/04/cisco-and-nxp-encourage-car-communication-to-make-driving-safer/, Rebecca Grant dated Jan. 4, 2013.

Yang et al., "A vehicle-to-vehicle communication protocol for cooperative collision warning"; Aug. 2004.

Festag et al., "Vehicle-to-vehicle and road-side sensor communication for enhanced road safety"; Nov. 2008.

Zalstein, David, Car Advice. com webpage, "First large-scale vehicle-to-vehicle communication technology test unveiled" dated Aug. 22, 2012, www.caradvice.com.au/187379/first-large-scale-vehicle-to-vehicle-communication-technology-test-unveiled/basic-rgb-4/, 3 pages.

BMW.com webpage; "BMW Technology Guide: Car-to-car communication" www.bmw.com/com/en/insights/technology/technology_guide/articles/cartocar_communication.html; downloaded Apr. 5, 2013.

NEC.com webpage; "Car2Car Communication" www/NEC.com/en/global.onlinetv/en/society/car_commu_I:html;downloaded Apr. 5, 2013.

Feb. 11, 2021—(EP) Examination Report—App. No. 168080984.

(56) References Cited

OTHER PUBLICATIONS

Mar. 10, 2021—(US) Notice of Allowance—U.S. Appl. No. 16/117,069.
Apr. 19, 2018 (US) Final Office Action—U.S. Appl. No. 14/458,764.
May 14, 2018 (US) Non-Final Office Action—U.S. Appl. No. 14/458,826.
May 15, 2018 (US) Notice of Allowance—U.S. Appl. No. 14/163,719.
May 17, 2018 (US) Notice of Allowance—U.S. Appl. No. 14/697,131.
May 18, 2018 (US) Non-Final Office Action—U.S. Appl. No. 14/458,744.
Jun. 6, 2018—(US) Notice of Allowance—U.S. Appl. No. 15/015,623.
Jun. 14, 2018—(US) Final Office Action—U.S. Appl. No. 14/458,796.
Jun. 5, 2018—(CA) Office Action—App 2,975,087.
Aug. 14, 2018—(US) Notice of Allowance—U.S. Appl. No. 14/607,433.
Sep. 4, 2018—(US) Notice of Allowance—U.S. Appl. No. 14/816,336.
Sep. 17, 2018—(US) Notice of Allowance—U.S. Appl. No. 15/168,638.
"Background on Self-Driving Cars and Insurance", Auto Technology, Insurance Information Institute, Inc. (Year 2018).
Test 2.
Oct. 11, 2018—(US) Notice of Allowance—U.S. Appl. No. 15/206,521.
Dec. 6, 2018—(US) Notice of Allowance—U.S. Appl. No. 15/013,523.
Baronti, et al., "Distributed Sensor for Steering Wheel Grip Force Measurement in Driver Fatigue Detection," Department of Engineering and Information, University of Pisa, Italy, pp. 1-4. (Year: 2009).
JI, et al., "Real-Time Nonintrusive Monitoring and Prediction of Driver Fatigue," IEEE Transactions on Vehicular Technology, vol. 53, No. 4, pp. 1-17 (Year: 2004).
Oct. 22, 2018 (CA) Office Action—App. 2,988,134.
Jan. 8, 2019—(US) Notice of Allowance—U.S. Appl. No. 15/206,521.
Jan. 23, 2019—(US) Final Office Action—U.S. Appl. No. 14/458,826.
U.S. Appl. No. 61/391,271, filed Oct. 8, 2010, Specification, "Google 3.8-292", "Autonomous Vehicles", Zhu et al., 56 pages (Year: 2010).
U.S. Appl. No. 61/391,271, filed Oct. 8, 2010, Appendix to the Specification, "Appendix B", "User Interface for Displaying Internal State of Autonomous Driving System", Zhu et al., 37 pages (Year: 2010).
Jan. 28, 2019—(US) Final Office Action—U.S. Appl. No. 14/458,744.
"Your Questions Answered: Driverless Cars", Stephen Harris, The Engine (Online), Feb. 17, 2014; n/a. ProQuest. Web. Jan. 18, 2019 (Year 2014).
Feb. 11, 2019—(EP) Supplementary Search Report—EP16743839.9.
Apr. 5, 2019—(US) Notice of Allowance—U.S. Appl. No. 15/166,638.
Mar. 21, 2019 (CA) Office Action—App. 2,975,087.
May 1, 2019—(US) Non-Final Office Action—U.S. Appl. No. 14/458,764.
May 3, 2019—(US) Non-Final Office Action—U.S. Appl. No. 14/458,796.
May 15, 2019 (EP) Extended European Search Report—App. 16808098.4.
Jun. 18, 2019 (US) Notice of Allowance and Fees Due—U.S. Appl. No. 15/206,521.
Jun. 26, 2019—(US) Non-Final Office Action—U.S. Appl. No. 14/458,744.
Jul. 25, 2019—(US) Non-Final Office Action—U.S. Appl. No. 16/294,103.
Aug. 27, 2019—(US) Notice of Allowance—U.S. Appl. No. 15/166,638.
Aug. 22, 2019—(US) Non-Final Office Action—U.S. Appl. No. 15/974,861.
Aug. 22, 2019—(US) Non-Final Office Action—U.S. Appl. No. 16/021,593.
Aug. 27, 2019—(US) Non-Final Office Action—U.S. Appl. No. 16/021,678.
Sep. 19, 2019—(US) Non-Final Office Action—U.S. Appl. No. 14/458,826.
Zhu et al., U.S. Appl. No. 61/391,271, filed Oct. 8, 2010, Specification "Google 3.8-392", "Autonomous Vehicles", 56 pages, Year 2010.
Zhu et al., U.S. Appl. No. 61/391,271, filed Oct. 8, 2010, Appendix to the Specification, "Appendix B", "User Interface for Displaying Internal State of Autonomous Driving System", 37 pages, Year 2010.
Oct. 30, 2019—(US) Notice of Allowance—U.S. Appl. No. 14/458,764.
Wu et al., "Petri Net Modeling of the Cooperation Behavior of a Driver and a Copilot in an Advanced Driving Assistance System", IEEE Transactions on Intelligent Transportation Systems, vol. 12, Issue 4, Dec. 1, 2011, pp. 977-989, Year 2011.
Oct. 31, 2019—(US) Notice of Allowance—U.S. Appl. No. 14/458,744.
Nov. 4, 2019—(US) Notice of Allowance—U.S. Appl. No. 14/458,796.
J.F. Coughlin, B. Reimer, B. Mehler, "Monitoring Managing and Motivating Driver Safety and Well-Being", IEEE Pervasive Comput., vol. 10 No. 3, pp. 14-21, Year 2011.
Nov. 25, 2019—(IN) Office Action—Application No. 201727043994.
Dec. 12, 2019—(US) Non-Final Office Action—U.S. Appl. No. 15/827,860.
Nov. 26, 2019 (US) Notice of Allowance—U.S. Appl. No. 15/166,638.
Dec. 11, 2019 (US) Non-Final Office Action—U.S. Appl. No. 16/102,089.
May 15, 2019 (EP) European Extended Search Report—Application No. 16808098.4. (006591.01636).
Jan. 4, 2017 (US) Non-Final Office Action—U.S. Appl. No. 14/697,141.
Jan. 12, 2017 (US) Non-Final Office Action—U.S. Appl. No. 14/458,826.
Jan. 13, 2017 (US) Non-Final Office Action—U.S. Appl. No. 14/458,744.
Jan. 19, 2017 (US) Final Office Action—U.S. Appl. No. 14/673,150.
Feb. 10, 2017 (US) Final Office Action—U.S. Appl. No. 14/733,576.
Mar. 27, 2017 (US) Non-Final Office Action—U.S. Appl. No. 15/015,623.
Apr. 5, 2017 (US) Final Office Action—U.S. Appl. No. 14/184,272.
Apr. 6, 2017 (US) Non-Final Office Action—U.S. Appl. No. 14/697,153.
Apr. 6, 2017 (US) Non-Final Office Action—U.S. Appl. No. 14/816,336.
Apr. 7, 2017 (US) Non-Final Office Action—U.S. Appl. No. 14/816,299.
Apr. 21, 2017 (US) Non-Final Office Action—U.S. Appl. No. 14/862,266.
Apr. 21, 2017 (US) Non-Final Office Action—U.S. Appl. No. 15/206,521.
May 19, 2017 (US) Notice of Allowance—U.S. Appl. No. 14/163,719.
Jun. 1, 2017 (US) Final Office Action—U.S. Appl. No. 14/458,796.
Jun. 2, 2017 (US) Non-Final Office Action—U.S. Appl. No. 14/607,433.
Apr. 28, 2017 (WO) International Search Report—PCT/US17/16176.
Jun. 6, 2017 (US) Final Office Action—U.S. Appl. No. 14/697,141.
Jun. 13, 2017 (US) Final Office Action—U.S. Appl. No. 14/458,764.
Jun. 16 2017 (US) Final Office Action—U.S. Appl. No. 14/697,131.
Jul. 13, 2017 (US) Non-Final Office Action—U.S. Appl. No. 14/733,576.
Jul. 27, 2017 (US) Final Office Action—U.S. Appl. No. 14/458,826.
Aug. 8, 2017 (US) Final Office Action—U.S. Appl. No. 15/015,623.
Aug. 15, 2017 (US) Final Office Action—U.S. Appl. No. 14/458,744.
Aug. 22, 2017 (US) Non-Final Office Action—U.S. Appl. No. 14/673,150.
Aug. 30, 2017 (US) Notice of Allowance—U.S. Appl. No. 14/862,266.
Sep. 7, 2017 (US) Non-Final Office Action—U.S. Appl. No. 14/458,764.
Jun. 22, 2016 (US) Non-Final Office Action—U.S. Appl. No. 14/607,433.
Sep. 21, 2017 (US) Final Office Action—U.S. Appl. No. 14/816,299.
Oct. 3, 2017 (US) Non-Final Office Action—U.S. Appl. No. 14/458,796.
U.S. Appl. No. 61/391,271, filed Oct. 8, 2010, Appendix to the Specification, "Appendix B", (incorporated by reference in US 20120083960, Zhu, J. et al.)) (Year: 2010).
U.S. Appl. No. 61/391,271, filed Oct. 8, 2010, Specification, "Google 3.8-292" (incorporated by reference in US 2012-0083960 (Zhu, J. et al)) (Year: 2010).
Oct. 5, 2017 (US) Final Office Action—U.S. Appl. No. 14/607,433.
Oct. 6, 2017 (US) Final Office Action—U.S. Appl. No. 14/697,153.
Oct. 26, 2017 (US) Notice of Allowance—U.S. Appl. No. 15/206,521.
Nov. 30, 2017 (US) Non-Final Office Action—U.S. Appl. No. 14/697,141.
Dec. 5, 2017 (US) Final Office Action—U.S. Appl. No. 14/816,336.
Dec. 20, 2017 (US) Notice of Allowance—U.S. Appl. No. 14/184,272.

(56) References Cited

OTHER PUBLICATIONS

Dec. 22, 2017 (US) Notice of Allowance—U.S. Appl. No. 14/733,576.
Dec. 26, 2017 (US) Notice of Allowance—U.S. Appl. No. 14/163,719.
Dec. 27, 2017 (US) Non-Final Office Action—U.S. Appl. No. 14/697,131.
Jan. 8, 2018 (US) Non-Final Office Action—U.S. Appl. No. 15/015,623.
Feb. 7, 2018 (US) Non-Final Office Action—U.S. Appl. No. 15/166,638.
Feb. 12, 2018 (US) Notice of Allowance—U.S. Appl. No. 14/673,150.
Mar. 9, 2018 (US) Non-Final Office Action—U.S. Appl. No. 15/013,523.
Mar. 14, 2018 (US) Non-Final Office Action—U.S. Appl. No. 14/607,433.
Mar. 13, 2018 (US) Notice of Allowance—U.S. Appl. No. 15/206,521.
Mar. 29, 2018 (US) Notice of Allowance—U.S. Appl. No. 14/697,141.
Apr. 2, 2018 (US) Notice of Allowance—U.S. Appl. No. 14/697,153.
Mar. 30, 2018 (US) Notice of Allowance—U.S. Appl. No. 14/816,299.
Apr. 2, 2018 (US) Non-Final Office Action—U.S. Appl. No. 14/816,336.
Doug Newcomb., "Autonomous Cars will Usher in Things We Never Saw Coming," Opinions, PC Magazine Digital Edition, pp. 1-4, (Year: 2016).
Harris, Stephen., "Your Questions Answered: Driverless Cars," The Engineer (Online) Feb. 17, 2014: n/a. ProQuest. Web. Jan. 18, 2019 (Year: 2014).
Jan. 27, 2020—(US) Notice of Allowance—U.S. Appl. No. 14/458,826.
"Driver Monitors: Improving Transportation Safety and Enhancing Performance Through Behavioral Change", Ballard, T., Melton, A., and Sealy, I., Society of Petroleum Engineers, Jan. 1, 2004, Year: 2004.
Jan. 31, 2020—(US) Final Office Action—U.S. Appl. No. 16/021,593.
Feb. 3, 2020—(US) Notice of Allowance—U.S. Appl. No. 14/458,744.
Feb. 4, 2020—(US) Notice of Allowance—U.S. Appl. No. 14/458,764.
"Petri Net Modeling of the Cooperation Behavior of a Driver and a Copilot in an Advanced Driving Assistance System", Wu et al., IEEEE Transportation on Intelligent Transportation Systems, vol. 12, Issue 4, Dec. 1, 2011, pp. 977-989 (Year 2011).
Feb. 6, 2020—(US) Final Office Action—U.S. Appl. No. 15/974,861.
Feb. 5, 2020—(US) Notice of Allowance—U.S. Appl. No. 14/458,796.
Feb. 14, 2020—(US) Final Office Action—U.S. Appl. No. 16/021,678.
Feb. 26, 2020—(US) Notice of Allowance—U.S. Appl. No. 15/206,521.
Mar. 19, 2020—(US) Non-Final Office Action—App. No. 16/294,103.
Apr. 16, 2020—(US) Non-Final Office Action—U.S. Appl. No. 15/890,701.
Apr. 20, 2020—(US) Notice of Allowance—U.S. Appl. No. 15/206,521.
Apr. 20, 2020—(US) Notice of Allowance—U.S. Appl. No. 15/827,860.
Apr. 29, 2020—(US) Notice of Allowance—U.S. Appl. No. 15/900,861.
May 21, 2020—(US) Notice of Allowance—U.S. Appl. No. 14/458,744.
Jun. 1, 2020—(US) Notice of Allowance—U.S. Appl. No. 14/458,826.
Jun. 9, 2020—(US) Notice of Allowance—U.S. Appl. No. 16/102,089.
Cusano et al., "Driverless Cars Will Change Auto Insurance. Here's How Insurers Can Adapt", Business Models, Harvard Business School Publishing Corporation, December (Year: 2017).
Jun. 9, 2020—(US) Notice of Allowance—U.S. Appl. No. 14/458,764.
Jun. 9, 2020—(US) Notice of Allowance—U.S. Appl. No. 14/458,796.
Jun. 18, 2020—(US) Notice of Allowance—U.S. Appl. No. 15/166,638.
Aug. 18, 2020—(US) Final Office Action—U.S. Appl. No. 15/900,861.
Aug. 19, 2020—(US) Notice of Allowance—U.S. Appl. No. 15/827,860.
Aug. 21, 2020—(US) Non-Final Office Action—U.S. Appl. No. 16/021,593.
Aug. 26, 2020—(US) Notice of Allowance—U.S. Appl. No. 15/890,701.
Sep. 2, 2020—(US) Notice of Allowance—App 16/294,103.
Sep. 21, 2020—(US) Non-Final Office Action—U.S. Appl. No. 15/974,861.
Oct. 14, 2020—(US) Non-Final Office Action—U.S. Appl. No. 16/021,678.
Nov. 16, 2020—(US) Notice of Allowance—U.S. Appl. No. 15/890,701.
Mar. 12, 2021—(US) Non-Final Office Action—U.S. Appl. No. 15/900,861.
Mar. 31, 2021—(US) Notice of Allowance—U.S. Appl. No. 15/974,861.
Apr. 1, 2021—(US) Notice of Allowance—U.S. Appl. No. 16/021,593.
Apr. 16, 2021 (US) Notice of Allowance—U.S. Appl. No. 15/974,861.
Apr. 29, 2020—(US) Non-Final Office Action—U.S. Appl. No. 15/900,861, 140 Pages.
Dec. 18, 2020—(US) Notice of Allowance—U.S. Appl. No. 16/117,069, 129 Pages.
Jan. 11, 2021—(US) Notice of Allowance—U.S. Appl. No. 16/021,593, 17 Pages.
Cafiso S., et al., "Safety Index for Evaluation of Two-Lane Rural Highways," Transportation Research Record, vol. 2019 (1), 2007, pp. 136-145.
International Search Report for International Application No. PCT/US2016/036136, mailed Aug. 31, 2016, 03 pages.
Leur P.D., et al., "Development of a Road Safety Risk Index," Transportation Research Record, vol. 1784 (1), 2000, pp. 33-42.
Jul. 19, 2022—(US) Non-Final Office Action—U.S. Appl. No. 17/014,222, 54 Pages.
Jul. 25, 2023 (US) Non-Final Office Action—U.S. Appl. No. 17/014,222, 61 Pages.
Zhu et al., U.S. Appl. No. 61/391,271, filed Oct. 8, 2010, Appendix to the Specification, "Appendix B," "User Interface For Displaying Internal State of Autonomous Driving System", 37 pages. 2010.
Zhu et al., U.S. Appl. No. 61/391,271, filed Oct. 8, 2010, Specification, "GOOGLE 3.8-292," "Autonomous Vehicles", 56 pages, 2010.

\* cited by examiner ical Field

Aspects of the disclosure generally relate to the analysis of vehicle driving data of vehicles that have engaged in autonomous driving for the purposes of determining aspects of vehicle insurance. In particular, various aspects of the disclosure relate to receiving vehicle operational data of vehicles that have engaged in autonomous driving and determining aspects related to an insurance policy associated with the vehicle.

Background

Many vehicles include sensors and internal computer systems designed to monitor and control vehicle operations, driving conditions, and driving functions. Advanced vehicles systems can perform such tasks as detecting and correcting a loss of traction on an icy road, self-parking, or detecting an imminent collision or unsafe driving condition and automatically making evasive maneuvers. Additionally, vehicles can include autonomous driving systems that assume all or part of real-time driving functions to operate the vehicle without real-time input from a human operator.

Many vehicles also include communication systems designed to send and receive information from inside or outside the vehicle. Such information can include, for example, vehicle operational data, driving conditions, and communications from other vehicles or systems. For example, a Bluetooth system may enable communication between the vehicle and the driver's mobile phone. Telematics systems may be configured to access vehicle computers and sensor data, including on-board diagnostics systems (OBD), and transmit the data to a display within the vehicle, a personal computer or mobile device, or to a centralized data processing system. Additionally, vehicle-to-vehicle (V2V) communication systems can be used to send and receive information from other nearby vehicles. Data obtained from vehicle sensors, Telematics systems, OBD systems, and V2V systems, have been used for a variety of purposes, including maintenance, diagnosis, and analysis.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods and computer devices for transmitting and receiving vehicle operational data, analyzing vehicle operational data to determine a mileage unit which includes a distance traveled by the vehicle when the vehicle was engaged in autonomous driving, determining a distance-based autonomous driving insurance rating factor using the mileage unit, and determining a property of an insurance policy of the vehicle using the distance-based autonomous driving insurance rating factor. The property of the insurance policy can include, for example, a premium, a deductible, a coverage term, and coverage amount. The distance-based autonomous driving insurance rating factor can be based on at least one input variable. Such input variable can include, for example, vehicle operational data, distance-based mileage units determined from the vehicle operational data when the vehicle was engaged in autonomous driving, road-type data, driver data, weather conditions, an autonomous driving system quality rating, and other driving data.

In accordance with further aspects of the present disclosure, vehicle operational data can be analyzed to determine a first mileage unit related to a total distance traveled by the vehicle when the vehicle was engaged in autonomous driving over a first period of time and a second mileage unit related to a total distance traveled by the vehicle over the period of time. The first mileage unit and the second mileage unit can be used to determine a property of an insurance policy associated with the vehicle. For example, a comparison of the first mileage unit and the second mileage unit can be made, such as a ratio between the first mileage unit and the second mileage unit, to determine the property. For example, when the property is a premium, a first premium rate can be applied when the ratio is above a threshold value and a second premium rate can be applied when the ratio is below the threshold value. In addition, other mileage units can be determined based on, for example, distance traveled by the vehicle when the vehicle is driven autonomously, and/or over certain road-types. Properties of a vehicle insurance policy can be determined using the mileage units and comparisons of the mileage units. In addition, an autonomous driving system quality rating can be used to determine a property of a vehicle insurance policy. The autonomous driving system quality rating can be, for example, a rating of the likelihood of an autonomous driving system of the vehicle to avoid accidents.

Aspects of the present disclosure improve determination of properties of insurance policies for vehicles that engage in autonomous driving. Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
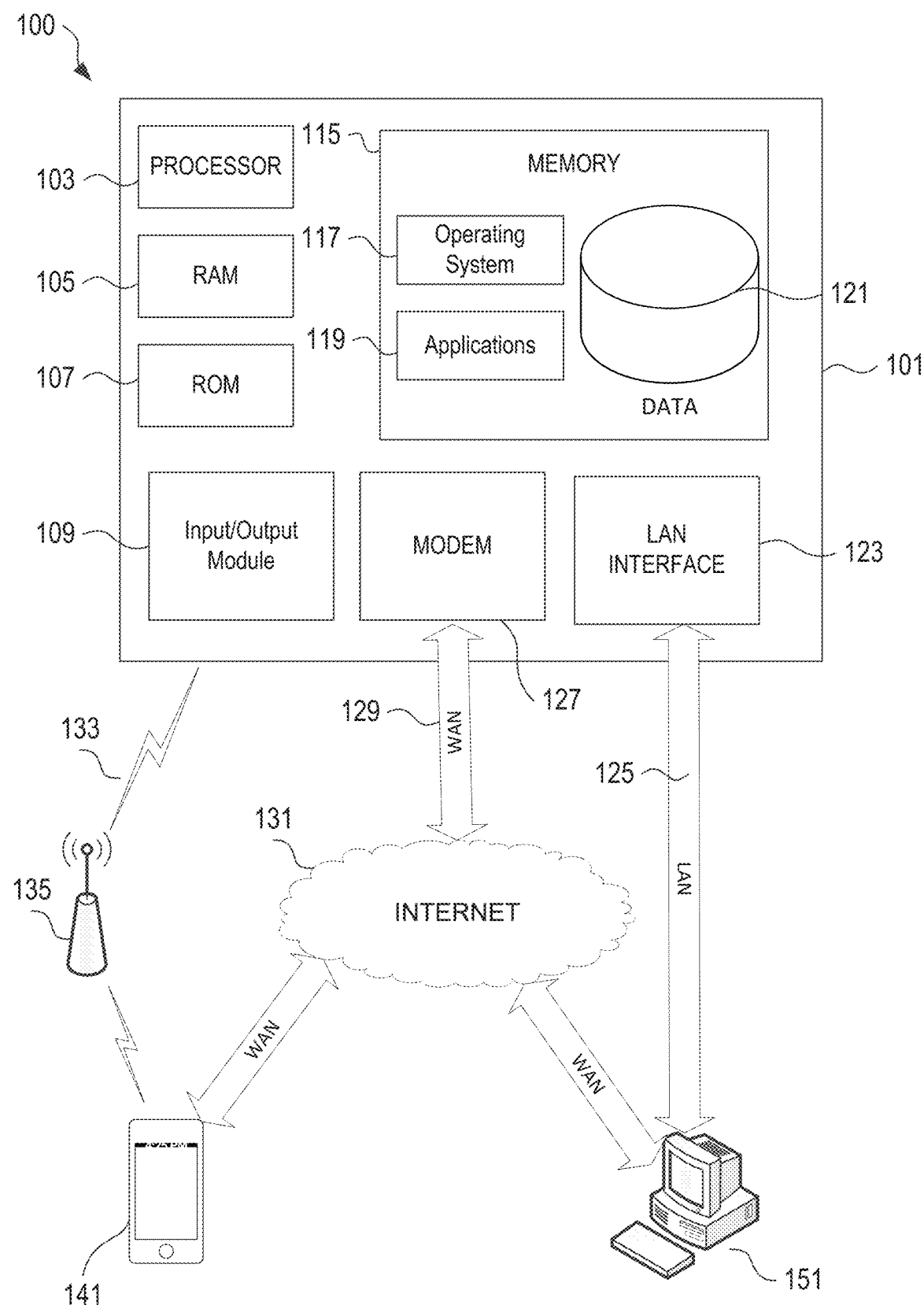
FIG. 1 illustrates a network environment and computing systems that may be used to implement aspects of the disclosure.

FIG. 1 illustrates a block diagram of a computing device 101 in driving analysis communication system 100 that may be used according to one or more illustrative embodiments of the disclosure. The driving analysis computing device 101 may have a processor 103 for controlling overall operation of the device 101 and its associated components, including RAM 105, ROM 107, input/output module 109, and memory unit 115. The computing device 101, along with one or more additional devices (e.g., terminals 141, 151) may correspond to any of multiple systems or devices, such as a driving analysis computing devices or systems, configured as described herein for transmitting and receiving vehicle operational data, analyzing vehicle operational data, determining aspects related to vehicle insurance rating factors, including distance-based autonomous driving insurance rating factors, and determining properties of vehicle insurance policies. Vehicle operational data can include data collected from vehicle sensors and OBD systems. Vehicle operations can also include data pertaining to the driver of a vehicle. Vehicle operational data can also include data pertaining to other nearby vehicles collected via, for example, V2V communications. As used herein, vehicle operation data is used interchangeably with driving data.

Input/Output (I/O) 109 may include a microphone, keypad, touch screen, and/or stylus through which a user of the computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the driving analysis system 101 to execute a series of computer-readable instructions to transmit or receive vehicle driving data, analyze driving data, determine driving characteristics from the driving data, and determine properties of, for example, vehicle insurance policies using the driving data.

The driving analysis computing device 101 may operate in a networked environment 100 supporting connections to one or more remote computers, such as terminals/devices 141 and 151. Driving analysis computing device 101, and related terminals/devices 141 and 151, may include devices installed in vehicles, mobile devices that may travel within vehicles, or devices outside of vehicles that are configured to receive and process vehicle and driving data. Thus, the driving analysis computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the driving analysis computing device 101. The network connections depicted in FIG. 1 include a local area network (LAN) 125 and a wide area network (WAN) 129, and a wireless telecommunications network 133, but may also include other networks. When used in a LAN networking environment, the driving analysis computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the driving analysis computing device 101 may include computer executable instructions (e.g., driving data analysis programs, driving characteristic algorithms, driving and insurance policy properties algorithms, vehicle insurance rating factor algorithms, and driver reward algorithms) for transmitting and receiving vehicle driving data, determining mileage units indicating distances traveled by the vehicle while the vehicle was engaged in autonomous driving, determining distance-based autonomous driving insurance rating factors, determining various properties associated with one or more vehicle insurance policies, and performing other related functions as described herein.

As used herein, vehicle operational data may refer to information pertaining to one or more actions or events performed by a vehicle and can include aspects of information identified or determined from data collected from a vehicle. Vehicle operational data can include, for example, a vehicle speed and/or gas mileage. In addition, for example, vehicle operational data may include an indication that the vehicle is engaged in autonomous driving, a road condition, a road-type and other operational data collected from the vehicle. As discussed below, a mileage unit indicating a distance traveled by the vehicle when the vehicle has engaged in autonomous driving can be determined from driving data collected by a vehicle sensors and telematics device, and/or additional data received from other nearby vehicles using vehicle-to-vehicle (V2V) communications. It should be understood that vehicle operational data may be associated with a vehicle, a driver, or a group of vehicles or drivers engaged in social interaction, such as an autonomous droning relationship.

In addition, as used herein, a vehicle insurance rating factor may refer to a factor which reflects a relative level of risk associated with aspects of vehicle insurance. The vehicle insurance rating factor can be based on or more data points and be used to determine a property of a vehicle insurance policy. A property of a vehicle insurance policy can include, for example, a premium, a deductible, a coverage term, and a coverage amount. An example vehicle insurance rating factor of the instant disclosure includes a distance-based autonomous driving insurance rating factor. As used herein, a distance-based autonomous driving insurance rating factor is used synonymously with distance-based autonomous driving insurance factor.

Figure 2:
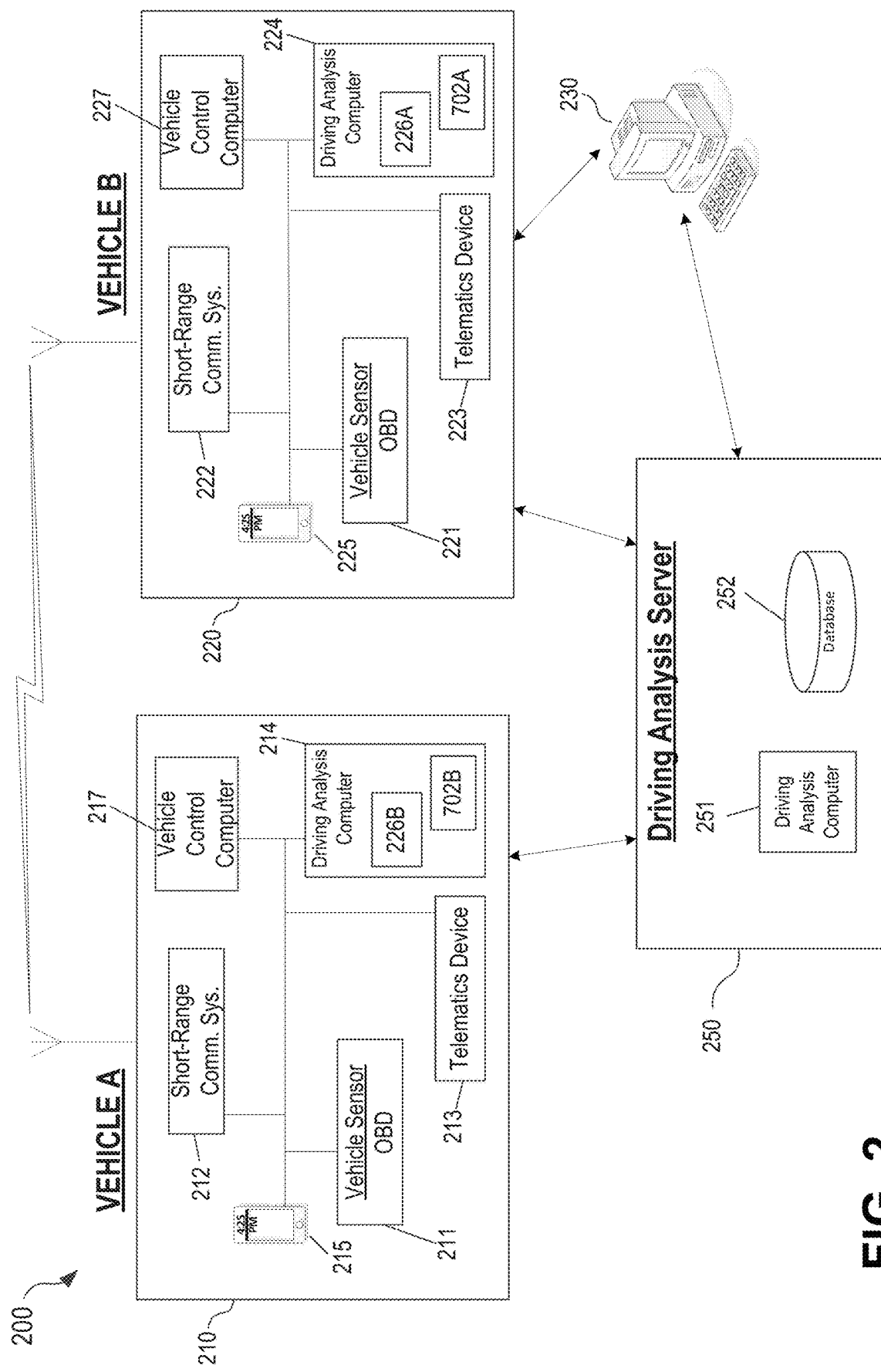
FIG. 2 is a diagram illustrating various example components of a driving analysis computing device according to one or more aspects of the disclosure.

FIG. 2 is a diagram of an illustrative driving analysis system 200 including two vehicles 210 and 220, a driving analysis server 250, and additional related components. Each component shown in FIG. 2 may be implemented in hardware, software, or a combination of the two. Additionally, each component of the driving analysis system 200 may include a computing device (or system) having some or all of the structural components described above for computing device 101.

Vehicles 210 and 220 in the driving analysis system 200 may be, for example, automobiles, motorcycles, scooters, buses, recreational vehicles, boats, or other vehicles for which a vehicle driving data may be collected and analyzed. The vehicles 210 and 220 each include vehicle operation sensors 211 and 221 capable of detecting and recording various conditions at the vehicle and operational parameters of the vehicle. For example, sensors 211 and 221 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensors 211 and 221 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle OBD.

Additional sensors 211 and 221 may detect and store the external driving conditions, for example, external temperature, rain, snow, light levels, and sun position for driver visibility. For example, external cameras and proximity sensors 211 and 221 may detect other nearby vehicles, vehicle spacing, traffic levels, road conditions, traffic obstructions, animals, cyclists, pedestrians, and other conditions that may factor into a driving data analysis. Sensors 211 and 221 also may detect and store data relating to moving violations and the observance of traffic signals and signs by the vehicles 210 and 220. Additional sensors 211 and 221 may detect and store data relating to the maintenance of the vehicles 210 and 220, such as the engine status, oil level, engine coolant temperature, odometer reading, the level of fuel in the fuel tank, engine revolutions per minute (RPMs), software upgrades, and/or tire pressure.

Vehicles sensors 211 and 221 also may include cameras and/or proximity sensors capable of recording additional conditions inside or outside of the vehicles 210 and 220. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle). Sensors 211 and 221 also may be configured to collect data a driver's movements or the condition of a driver. For example, vehicles 210 and 220 may include sensors that monitor a driver's movements, such as the driver's eye position and/or head position, etc. Additional sensors 211 and 221 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain vehicle sensors 211 and 221 also may collect information regarding the driver's route choice, whether the driver follows a given route, and to classify the type of trip (e.g. commute, errand, new route, etc.). In certain embodiments, sensors and/or cameras 211 and 221 may determine when and how often the vehicles 210 and 220 stay in a single lane or stray into other lanes. A Global Positioning System (GPS), locational sensors positioned inside the vehicles 210 and 220, and/or locational sensors or devices external to the vehicles 210 and 220 may be used to determine the route, lane position, road-type (e.g. highway, entrance/exit ramp, residential area, etc.) and other vehicle position/location data.

The data collected by vehicle sensors 211 and 221 may be stored and/or analyzed within the respective vehicles 210 and 220, such as for example a driving analysis computer 214, 224 integrated into the vehicle, and/or may be transmitted to one or more external devices. For example, as shown in FIG. 2, sensor data may be transmitted via short-range communication systems 212 and 222 to other nearby vehicles. Additionally, the sensor data may be transmitted via telematics devices 213 and 223 to one or more remote computing devices, such as driving analysis server 250.

Short-range communication systems 212 and 222 are vehicle-based data transmission systems configured to transmit vehicle operational data to other nearby vehicles, and to receive vehicle operational data from other nearby vehicles. In some examples, communication systems 212 and 222 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 212 and 222 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 212 and 222 may be sent via DSRC, Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers) or may be implemented by software running on the mobile devices 215 and 225 of drivers and passengers within the vehicles 210 and 220.

The range of V2V communications between vehicle communication systems 212 and 222 may depend on the wireless communication standards and protocols used, the transmission/reception hardware (e.g., transceivers, power sources, antennas), and other factors. Short-range V2V communications may range from just a few feet to many miles, and different types of driving behaviors may be determined depending on the range of the V2V communications. For example, V2V communications ranging only a few feet may be sufficient for a driving analysis computing device 101 in one vehicle to determine that another vehicle is tailgating or cut-off the vehicle, whereas longer communications may allow the device 101 to determine additional types of driving behaviors (e.g., vehicle spacing, yielding, defensive avoidance, proper response to a safety hazard, etc.) and driving conditions (e.g., congestion).

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, etc.) certain vehicle operation data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle operation data to the other vehicles and/or devices.

The types of vehicle operational data, or vehicle driving data, transmitted by vehicles 210 and 220 may depend on the protocols and standards used for the V2V communication, the range of communications, the autonomous driving system, and other factors. In certain examples, vehicles 210 and 220 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as detection by the vehicle's 210 internal systems that the vehicle is skidding, that an impact has occurred, or that the vehicle's airbags have been deployed, also may be transmitted in V2V communications. In various other examples, any data collected by any vehicle sensors 211 and 221 potentially may be transmitted via V2V communication to other nearby vehicles or infrastructure devices receiving V2V communications from communication systems 212 and 222. Further, additional vehicle driving data not from the vehicle's sensors (e.g., vehicle make/model/year information, driver insurance information, driver scores, etc.) may be collected from other data sources, such as a driver's or passenger's mobile device 215 or 225, driving analysis server 250, and/or another external computer system 230, and transmitted using V2V communications to nearby vehicles and other transmitting and receiving devices using communication systems 212 and 222.

As shown in FIG. 2, the data collected by vehicle sensors 211 and 221 also may be transmitted to a driving analysis server 250, and one or more additional external servers and devices via telematics devices 213 and 223. Telematics devices 213 and 223 may be computing devices containing many or all of the hardware/software components as the computing device 101 depicted in FIG. 1. As discussed above, the telematics devices 213 and 223 may receive vehicle operation data and driving data from vehicle sensors 211 and 221, and may transmit the data to one or more external computer systems (e.g., driving analysis server 250 of an insurance company, financial institution, or other entity) over a wireless transmission network. Telematics devices 213 and 223 also may be configured to detect or determine additional types of data relating to real-time driving and the condition of the vehicles 210 and 220. In certain embodiments, the telematics devices 213 and 223 may contain or may be integral with one or more of the vehicle sensors 211 and 221 or system, such as an autonomous driving system. The telematics devices 213 and 223 also may store the type of their respective vehicles 210 and 220, for example, the make, model, trim (or sub-model), year, and/or engine specifications, autonomous driving system specifications, as well as other information such as vehicle owner or driver information, insurance information, and financing information for the vehicles 210 and 220.

In the example shown in FIG. 2, telematics devices 213 and 223 may receive vehicle driving data from vehicle sensors 211 and 221, and may transmit the data to a driving analysis server 250. However, in other examples, one or more of the vehicle sensors 211 and 221 or systems, including autonomous driving systems, may be configured to receive and transmit data directly from or to a driving analysis server 250 without using a telematics device. For instance, telematics devices 213 and 223 may be configured to receive and transmit data from certain vehicle sensors 211 and 221 or systems, while other sensors or systems may be configured to directly receive and/or transmit data to a driving analysis server 250 without using the telematics device 216. Thus, telematics devices 213 and 223 may be optional in certain embodiments.

In certain embodiments, vehicle sensors, vehicle OBD, autonomous driving systems, and/or vehicle communication systems, may collect and/or transmit data pertaining to autonomous driving of the vehicles. In autonomous driving, the vehicle fulfills all or part of the driving without being piloted by a human. An autonomous car can be also referred to as a driverless car, self-driving car, or robot car. For example, in autonomous driving, a vehicle control computer 217, 227 may be configured to operate all or some aspects of the vehicle driving, including but not limited to acceleration, braking, steering, and/or route navigation. A vehicle with an autonomous driving capability may sense its surroundings using the vehicle sensors 221, 221 and/or receive inputs regarding control of the vehicle from the vehicle communications systems, including but not limited to short range communication systems 212, 222 Telematics 213, 223 or other vehicle communication systems.

In certain embodiments, mobile computing devices 215 and 225 within the vehicles 210 and 220 may be used to collect vehicle driving data and/or to receive vehicle driving data from vehicle communication systems and then to transmit the vehicle driving data to the driving analysis server 250 and other external computing devices. Mobile computing devices 215 and 225 may be, for example, mobile phones, personal digital assistants (PDAs), or tablet computers of the drivers or passengers of vehicles 210, 220. Software applications executing on mobile devices 215, 225 may be configured to detect certain driving data independently and/or may communicate with vehicle sensors 211, 221, Telematics 213, 223, autonomous driving systems, or other vehicle communication systems to receive additional driving data. For example, mobile devices 215, 225 equipped with GPS functionality may determine vehicle location, speed, direction and other basic driving data without needing to communicate with the vehicle sensors 211 or 221, or any vehicle system. In other examples, software on the mobile devices 215, 225 may be configured to receive some or all of the driving data collected by vehicle sensors 211, 221. Mobile computing devices 215 and 225 may also be involved with aspects of autonomous driving, including receiving, collecting, and transmitting vehicle operational data regarding autonomous driving and autonomous driving relationships between multiple vehicles.

When mobile computing devices 215 and 225 within the vehicles 210 and 220 are used to detect vehicle driving data and/or to receive vehicle driving data from vehicles 211 and 221, the mobile computing devices 215 and 225 may store, analyze, and/or transmit the vehicle driving data to one or more other devices. For example, mobile computing devices 215 and 225 may transmit vehicle driving data directly to one or more driving analysis servers 250, and thus may be used in conjunction with or instead of telematics devices 213 and 223. Additionally, mobile computing devices 215 and 225 may be configured to perform the V2V communications described above, by establishing connections and transmitting/receiving vehicle driving data to and from other nearby vehicles. Thus, mobile computing devices 215 and 225 may be used in conjunction with, or instead of, short-range communication systems 212 and 222 in some examples. In addition, mobile computing devices 215 and 225 may be used in conjunction with the vehicle control computers 217 and 227 for purposes of autonomous driving. Moreover, the processing components of the mobile computing devices 215 and 225 may be used to analyze vehicle driving data, determine a distance-based autonomous driving insurance factor, determine properties related to aspects of a vehicle insurance policy, and perform other related functions. Therefore, in certain embodiments, mobile computing devices 215 and 225 may be used in conjunction with, or in place of, the driving analysis computers 214 and 224.

Vehicles 210 and 220 may include driving analysis computers 214 and 224, which may be separate computing devices or may be integrated into one or more other components within the vehicles 210 and 220, such as the short-range communication systems 212 and 222, telematics devices 213 and 223, autonomous driving systems, or the internal computing systems of vehicles 210 and 220. As discussed above, driving analysis computers 214 and 224 also may be implemented by computing devices independent from the vehicles 210 and 220, such as mobile computing devices 215 and 225 of the drivers or passengers, or one or more separate computer systems 230 (e.g., a user's home or office computer). In any of these examples, the driving analysis computers 214 and 224 may contain some or all of the hardware/software components as the computing device 101 depicted in FIG. 1. Further, in certain implementations, the functionality of the driving analysis computers, such as storing and analyzing vehicle driving data, determining a distance-based autonomous driving insurance factor, and determining aspects of insurance polies, may be performed in a central driving analysis server 250 rather than by individual vehicles 210 and 220. In such implementations, the vehicles 210 and 220 might only collect and transmit vehicle driving data to a driving analysis server 250, and thus the vehicle-based driving analysis computers 214 and 224 may be optional.

Driving analysis computers 214 and 224 may be implemented in hardware and/or software configured to receive vehicle driving data from vehicle sensors 211 and 221, short-range communication systems 212 and 222, telematics devices 213 and 223, vehicle control computer 217 and 227, autonomous driving systems, and/or other driving data sources. Vehicle sensors/OBDs 211 and 221, short-range communication systems 212 and 222, telematics devices 213 and 223, vehicle control computer 217 and 227, autonomous driving systems, and/or other driving data sources can be referred to herein individually or collectively as a vehicle data acquiring component. The driving analysis computer 214, 224 may comprise an electronic receiver to interface with the vehicle data acquiring components to receive the collected data. After receiving, via the electronic receiver, the vehicle driving data from, for example, a vehicle data acquiring component, the driving analysis computers 214 and 224 may perform a set of functions to analyze the driving data and determine properties related to vehicle insurance. For example, the driving analysis computers 214 and 224 may include one or more a distance-based autonomous driving insurance factor algorithms, which may be executed by software running on generic or specialized hardware within the driving analysis computers. The driving analysis computer 214 in a first vehicle 210 may use the vehicle driving data received from that vehicle's sensors 211, along with vehicle driving data for other nearby vehicles received via the short-range communication system 212, to determine a distance-based autonomous driving insurance factor and determine properties related to vehicle insurance applicable to the first vehicle 210 and the other nearby vehicles. Within the driving analysis computer 214, a vehicle insurance property function may use the results of the driving analysis performed by the computer 214 to determine/adjust a property of an insurance policy associated with the vehicle 210 and/or a driver of a vehicle 210. Further descriptions and examples of the algorithms, functions, and analyses that may be executed by the driving analysis computers 214 and 224 are described below, including in reference to FIGS. 3, 4, and 5.

The system 200 also may include a driving analysis server 250, containing some or all of the hardware/software components as the computing device 101 depicted in FIG. 1. The driving analysis server 250 may include hardware, software, and network components to receive vehicle operational data/driving data from one or more vehicles 210 and 220, and other data sources. The driving analysis server 250 may include a driving data and driver data database 252 and driving analysis computer 251 to respectively store and analyze driving data received from vehicles and other data sources. The driving analysis server 250 may initiate communication with and/or retrieve driving data from vehicles 210 and 220 wirelessly via telematics devices 213 and 223, mobile devices 215 and 225, or by way of separate computing systems (e.g., computer 230) over one or more computer networks (e.g., the Internet). Additionally, the driving analysis server 250 may receive additional data from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

Data stored in the driving data database 252 may be organized in any of several different manners. For example, a table in database 252 may contain all of the vehicle operation data for a specific vehicle 210, similar to a vehicle event log. Other tables in the database 252 may store certain types of data for multiple vehicles. For instance, tables may store specific data sets, including data types discussed above (e.g. road-type information, insurance data, etc.).

The driving analysis computer 251 within the driving analysis server 250 may be configured to retrieve data from the database 252, or may receive driving data directly from vehicles 210 and 220 or other data sources, and may perform driving data analyses, determine distance-based autonomous driving insurance factor, and/or vehicle insurance determinations, and other related functions. The functions performed by the driving analysis computer 251 may be similar to those of driving analysis computers 214 and 224, and further descriptions and examples of the algorithms, functions, and analyses that may be executed by the driving analysis computer 251 are described below, including in reference to FIGS. 3, 4, and 5.

In various examples, the driving data analyses, mileage unit determinations, and/or insurance property determinations may be performed entirely in the driving analysis computer 251 of the driving analysis server 250 (in which case driving analysis computers 214 and 224 need not be implemented in vehicles 210 and 220), or may be performed entirely in the vehicle-based driving analysis computers 214 and 224 (in which case the driving analysis computer 251 and/or the driving analysis server 250 need not be implemented). In other examples, certain driving data analyses may be performed by vehicle-based driving analysis computers 214 and 224, while other driving data analyses are performed by the driving analysis computer 251 at the driving analysis server 250. For example, a vehicle-based driving analysis computer 214 may continuously receive and analyze driving data from nearby vehicles to determine certain driving characteristics (e.g., mileage units of distance traveled by the vehicle when the vehicle is engaged in autonomous driving) so that large amounts of driving data need not be transmitted to the driving analysis server 250. However, for example, after a mileage unit is determined by the vehicle-based driving analysis computer 214, the information may be transmitted to the server 250, and the driving analysis computer 251 may determine if a property of the insurance policy should be updated.

Figure 3:
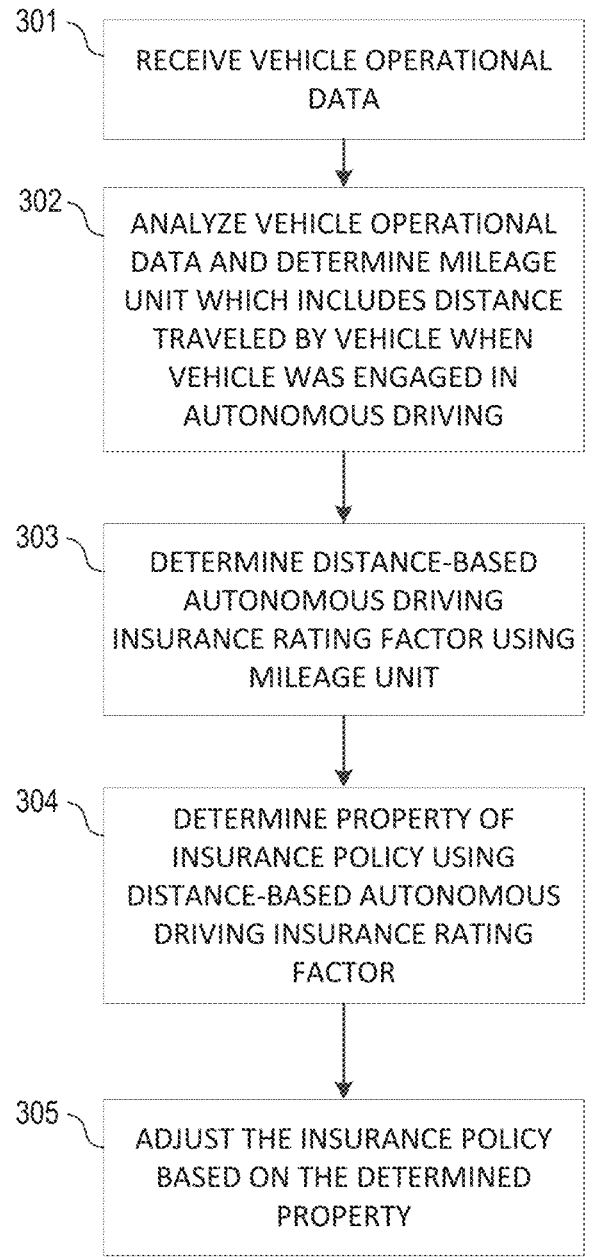
FIG. 3 is a flow diagram illustrating an example method of analyzing vehicle driving data.
Figure 4:
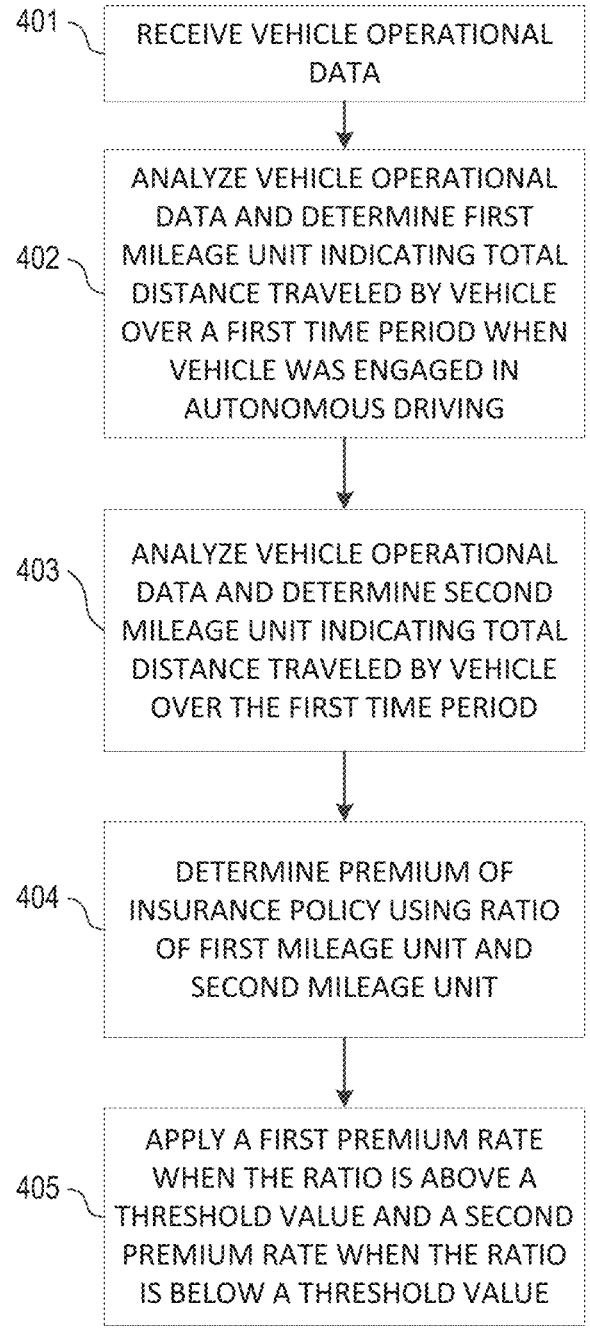
FIG. 4 is a flow diagram illustrating an example method of analyzing vehicle driving data.

FIG. 3 and FIG. 4 are flow diagrams illustrating example methods of determining a property of an insurance policy based on analysis of vehicle operational data of vehicles engaged in autonomous driving. FIG. 3 includes an example step of determining a distance-based autonomous driving insurance rating factor. The examples of FIG. 3 and FIG. 4 may be performed by one or more computing devices in a driving analysis system, such as vehicle-based driving analysis computers 214 and 224, a driving analysis computer 251 of a driving analysis server 250, user mobile computing devices 215 and 225, and/or other computer systems.

The steps shown in FIG. 3 describe performing an analysis of vehicle operational data to determine a distance-based autonomous driving insurance rating factor of vehicles engaged in an autonomous driving and determining a property of an insurance policy based on the factor. In step 301, vehicle operational data may be received from a first vehicle 210. As described above, a driving analysis computer 214 may receive and store vehicle driving data from a vehicle data acquiring component, including but not limited to the vehicle's internal computer systems and any combination of the vehicle's sensors/OBD 211 and/or communication systems. The data received in step 301 may include, for example, an identifier that the vehicle is engaged in autonomous driving. The data received in step 301 may include, for example, the location, speed, direction of travel, distance traveled, distance traveled while engaged in autonomous driving, object proximity data from the vehicle's external cameras and proximity sensors, and data from the vehicle's various systems used to determine if the vehicle 210 is braking, accelerating, or turning, etc., and status of the vehicle's user-operated controls (e.g., head lights, turn signals, hazard lights, radio, phone, etc.), along with any other data collected by vehicle sensors/OBD 211 or data received from a nearby vehicle.

In step 302, the vehicle operational data is analyzed to determine one or more mileage units. As used herein, a mileage unit indicates a distance traveled by the vehicle when the vehicle was engaged in autonomous driving for at least a portion of the distance traveled. For example, in an embodiment, a first mileage unit can indicate a total distance traveled by the vehicle when the vehicle was engaged in autonomous driving over a period of time. In addition, for example, a second mileage unit can indicate a total distance traveled by the vehicle over the same period of time as the first mileage unit. In such examples, the first mileage unit would be equal to the second mileage unit if the vehicle was engaged in autonomous driving over the entire distance driven over period of time. Or, the first mileage unit would be less than the second mileage unit if the vehicle was engaged in autonomous driving for only a portion of the distance driven over the period of time.

The driving analysis computer may determine a mileage unit from the vehicle operational data in multiple ways. The manner in which a mileage unit is determined may depend on the type of information included in the driving data. For example, the driving data may include an identifier which indicates that the vehicle is engaged in autonomous driving and information indicating distance traveled by the vehicle. Information indicating distance traveled may be obtained from, for example, the vehicle odometer, trip meter, and/or other distance measuring device of the vehicle. In addition, distance traveled information can be determined from other driving data including, for example, time and speed information and/or location information, such as GPS. Example algorithms using time marked driving data are included in US Publications Number 2013/0073112 which is hereby incorporated by reference herein in its entirety. In addition, mileage units can be determined to indicate a distance traveled by the vehicle over a single trip, multiple trips, a period of time, and/or in an ongoing tally. Mileage units can also be determined from, for example, contiguous or non-contiguous distances traveled by the vehicle. Mileage units can also be determined from, for example, distances traveled when at least one other condition is satisfied during travel, including a distance traveled over a certain road-type, driving during a certain weather condition, and/or driving in a certain location. A period of time can be, for example, a six-month term of an insurance policy associated with the vehicle. In addition, for example, a period of time can be a month, a week, a day, a hour, a second, and/or multiples or combinations of the same.

In an example, the driving analysis computer can determine a mileage unit using an autonomous driving identifier to determine when the vehicle was engaged in autonomous driving and the distance traveled information collected from a distance measuring device of the vehicle to determine any number of various distances traveled by the vehicle when the vehicle was engaged in autonomous driving for at least a portion of the distance traveled. In an example, a mileage unit indicating a total distance traveled by the vehicle when the vehicle was engaged in autonomous driving over a sixth month period of time can be determined by adding all the distance segments traveled within the six-month time period when the autonomous driving indicator indicates that the vehicle was engaged in autonomous driving.

In certain embodiments, a mileage unit can be determined based on driving data additional to a distance traveled by the vehicle when the vehicle was engaged in autonomous driving for at least a portion of the distance traveled. For example, such additional driving data can include, for example, period of time, a road-type (e.g. highway, side road, etc.), road condition, speed, driver data, weather condition, time-of-day, driving event or action, congestion level, location, etc. For example, a first mileage unit can be determined to indicate a total distance traveled by the vehicle over a first road-type when the vehicle was engaged in autonomous driving for at least a portion the distance and a second mileage unit can be determined to indicate a total distance traveled by the vehicle over the first road-type when the vehicle was engaged in autonomous driving. In such example, the first mileage unit indicates total distance traveled over the road-type, and the second mileage unit indicates the amount of such total for which the vehicle was engaged in autonomous driving.

In step 303, the mileage units determined in step 302 may be used to determine a distance-based autonomous driving insurance rating factor. In addition, in an example, in step 303, the mileage units determined in step 302 and additional driving data may be used to determine a distance-based autonomous driving insurance factor. In an embodiment, a mileage unit determined in step 302 and additional driving data are input variables used to determine a distance-based autonomous driving insurance factor. For example, in step 303, the mileage units determined in step 302 and an autonomous driving system quality rating may be used to determine a distance-based autonomous driving insurance factor. In another example, in step 303, the mileage units determined in step 302 and an autonomous driving characteristic or event determined from the driving data can be used to determine a distance-based autonomous driving insurance factor. An autonomous driving characteristic or autonomous driving event can include, for example, actions performed or events undertaken by the vehicle or nearby vehicle—such as that the vehicle was a lead vehicle in an autonomous droning relationship or that the vehicle engaged in self-parking.

In step 304, a property of an insurance policy may be determined using the distance-based autonomous driving insurance rating factor. The property of an insurance policy can include any of a number of aspects of a vehicle insurance policy. For example, a property of an insurance policy can include a premium, a deductible, a coverage term, a coverage amount, or other attribute of an insurance policy. In various embodiments, the property can be determined in accordance with rules set forth by the insurance provider. For example, the property of the vehicle insurance policy may change depending upon any number of driving data points, driver information, and other information. For example, in step 304, a distance-based autonomous driving insurance factor may be determined using one or more mileage units determined in step 303. For example, in step 304, a distance-based autonomous driving insurance factor may be determined using a comparison between one or more mileage units. In an example, in step 304 a comparison between two or mileage units can be a ratio. For example, a ratio can be between a first mileage unit that indicates a total distance traveled by the vehicle when the vehicle was engaged in autonomous driving over the first period of time and a second mileage unit that indicates a total distance traveled by the vehicle over the first period of time. In such example, the ratio can indicate a percentage of the total distance traveled by the vehicle over the first period of time where the vehicle was engaged in autonomous driving. The ratio can be used to determine a property of a vehicle insurance policy. In an example, in step 304, where the property of the vehicle insurance policy is a premium, a first premium rate can be applied when the ratio is above a threshold value and a second premium rate can be applied when the ratio is below the threshold value. In an example, one or more premium rates can be applied on a per-mile basis.

In step 305, the driving analysis computer can adjust or cause to adjust the insurance policy based on the determined property. In various embodiments, the adjustment can occur during the coverage term and/or prior to an initial or subsequent coverage term. In addition, the policy holder may be notified of the adjustment. Alternatively, the adjustment can come in the form of a reward. Examples of using driving data to determine rewards, including driver rewards related to vehicle insurance, are disclosed in U.S. application Ser. No. 14/163,741 which is hereby incorporated by reference herein in its entirety.

Referring to FIG. 4, the steps shown in FIG. 4 describe an example of performing an analysis of vehicle operational data to determine mileage units indicating distances traveled by a vehicle over a period of time when the vehicle was engaged in autonomous driving over at least a portion of the distance traveled. In step 401, vehicle operational data may be received from a first vehicle 201. In step 402, the vehicle operational data is analyzed and a first mileage unit is determined to indicate a total distance traveled by the vehicle when the vehicle was engaged in autonomous driving over a period of time. In step 403, the vehicle operational data is analyzed and a second mileage unit is determined to indicate a total distance traveled by the vehicle over the same period of time as for the first mileage unit. In step 404, a premium of an insurance policy associated with the vehicle is determined using a ratio of the first mileage unit and the second mileage unit. In step 405, a first premium rate is applied when the ratio is above a threshold value and a second premium rate is applied when the ratio is below the threshold value.

Figure 5:
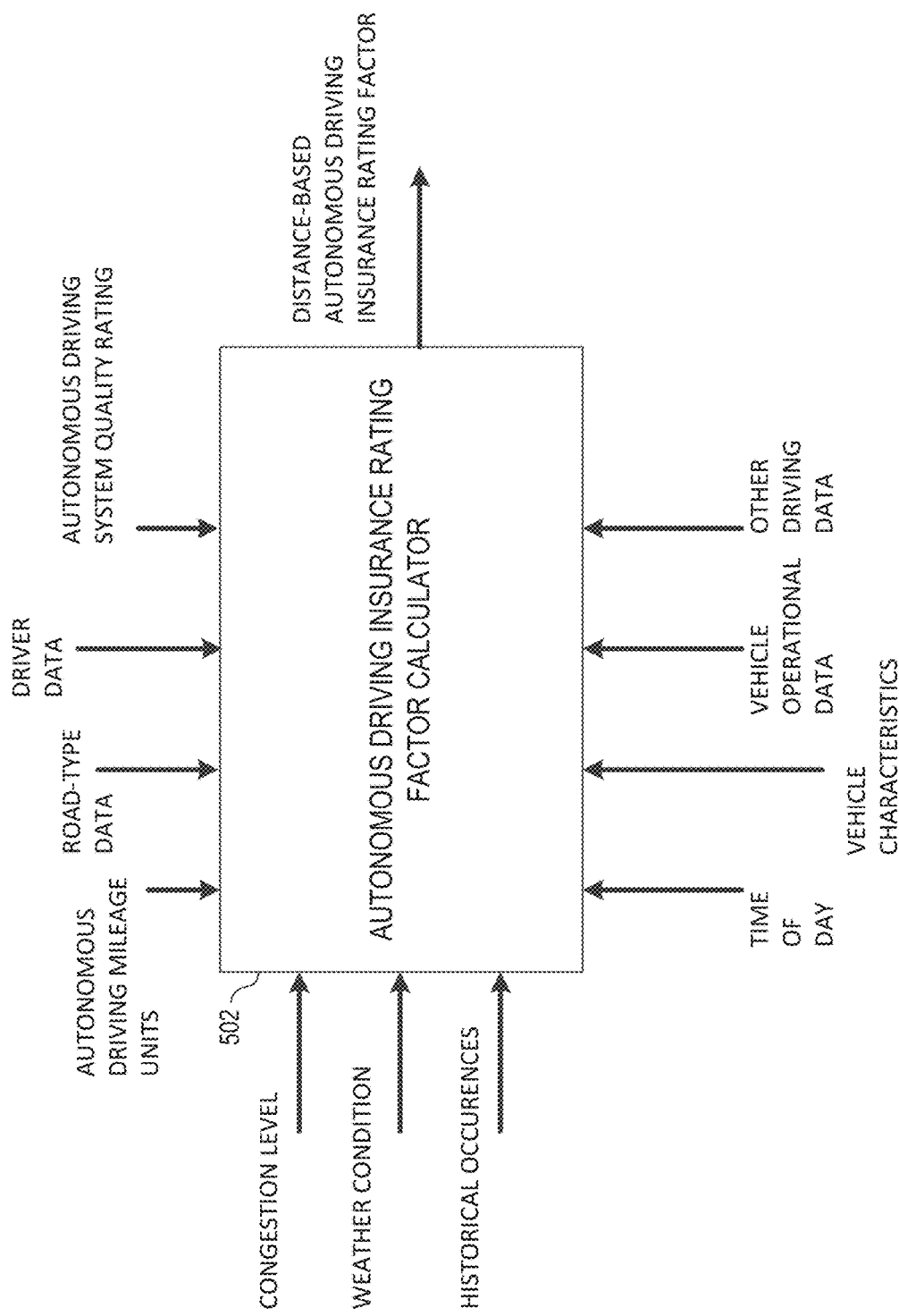
FIG. 5 is a diagram illustrating one example of an autonomous driving insurance rating factor calculator in accordance with various aspects of the disclosure.

Referring to FIG. 5, an autonomous driving insurance rating factor calculator 502 may calculate the distance-based autonomous driving insurance rating factor using at least one input variable. In various embodiments, an input variable can include at least one mileage unit or at least one mileage unit and additional driving data. The additional driving data may include, but is not limited to, at least one of: vehicle speed, location, road-type, weather condition, driver score, vehicle's characteristics (e.g., vehicle type-SUV, sports car, sedan, convertible, etc., vehicle's turning radius, vehicle's maximum speed, vehicle time to accelerate from 0-60 mph, and other characteristics tied to the specific vehicle), driving risk characteristics/profile of the driver/operator, and other characteristics.

In an embodiment, an input variable can include an autonomous driving system quality rating. For example, assuming numerous systems exist for autonomous driving, "System A" may use hardware and/or software algorithms different from that of competing "System B." As a result, each of the systems may react differently when used in the real world, and as such, will earn a driving risk characteristic/profile commensurate with the amount of risk associated with the particular system. In an embodiment, an autonomous driving system quality rating may indicate a rating of the likelihood of an autonomous driving system of the vehicle to avoid accidents involving the vehicle. Therefore, an autonomous driving insurance rating factor calculator 402 may take into account different quality rating/level of risk for "System A" than for "System B," in some examples. In another example, the autonomous driving system quality rating may take into account factors such as number of accidents, moving violations, number of submitted insurance claims, and other factors known for a particular autonomous driving system.

In addition, referring to FIG. 4, other information may also be inputted into the autonomous driving rating factor calculator 402 for consideration in calculating a distance-based autonomous driving insurance rating factor or other autonomous driving insurance rating factor. For example, the congestion level (e.g., traffic) on a roadway, the weather conditions the roadway, historical occurrences of incidents (e.g., vehicular accidents) on the roadway, and other factors related to the environment/surroundings in which the vehicle is operated. For example, the autonomous driving insurance rating factor calculator 402 may adjust the factor based on the congestion level on the roadway being high. In one example, the autonomous driving insurance rating factor calculator 402 may determine a factor value which indicates elevated risk during rush hour traffic to encourage vehicles 402 equipped with an autonomous driving system to engage in autonomous driving. Congestion levels may be divided, in one example, into categories of high, medium, and low based on the whether the travel time through a particular roadway falls into the upper ⅓, middle ⅓, or lower ⅓ of possible travels times historically logged on that roadway. Likewise, weather conditions may play a role in determining risk level. For example, in a fog situation, the risk may be relatively higher for manual driving versus autonomous driving. In order to encourage the driver to engage in autonomous driving, the calculator may determine a factor which indicates elevated risk for manual driving and lower risk for autonomous driving. The driving analysis computing device can, for example, determine a deductible amount which is higher for manual driving in the fog than autonomous driving in the fog. The driving analysis computing device can notify the driver of the vehicle of the deductible amount and/or difference in deductible amount to encourage the driver to engage in autonomous driving. The notice can be delivered in real-time to, for example, a display system of the vehicle or user device, such as mobile phone of the driver.

The various data from the preceding examples may be stored at and retrieved from various data sources, such as an external traffic databases containing traffic data (e.g., amounts of traffic, average driving speed, traffic speed distribution, and numbers and types of accidents, etc.) about various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), and insurance company databases containing insurance data (e.g., driver score, coverage amount, deductible amount, premium amount, insured status) for the vehicle, driver, and/or other nearby vehicles and drivers. The data may, in some examples, be wirelessly transmitted from a remote server and/or database to the vehicle 220 for consideration by the autonomous driving insurance rating factor calculator 402. As explained earlier, vehicles 210 may leverage additional hardware and/or software capabilities of another vehicle 220 or vehicles to gain access to the driving data and other information, when desired. For example, a vehicle 220 may receive, through its long-range communications circuitry 222 (or mobile phone 225), driving data/information and forward it to vehicles 210 via their short-range communications 212 systems. As such, the vehicles 210, 220 may input the information into their autonomous driving insurance rating factor calculator 402 for consideration.

FIG. 4 shows the autonomous driving insurance rating factor calculator 402 receiving numerous inputs and outputting a distance-based autonomous driving insurance rating factor. In some examples, the autonomous driving insurance rating factor calculator 402 may be an application-specific integrated circuit (ASIC) designed to perform the functionality described herein. In other examples, the autonomous driving insurance rating factor calculator 402 may use a processing unit (e.g., comprising a computer processor, such as an Intel™ x86 microprocessor or other special-purpose processors) and computer-executable instructions stored in a memory to cause a driving analysis computer 214 to perform the steps described herein.

As shown in FIG. 2, a single vehicle-based driving analysis computer 214 may receive driving data for a first vehicle 210 (steps 301, 401), including driving data received from V2V communications including driving data for one or more other vehicles, may determine from the data whether the vehicle is engaged in an autonomous driving, and may determine a characteristic of the autonomous driving (step 302, 402, and 403), determine a property of an insurance policy based on the characteristic (step 304, 404), and adjust the insurance policy based on the determined property (step 305). However, other driving analysis computers and/or other computing devices may be used to some or all of the steps and functionality described above in reference to FIGS. 3, 4, and 5. For example, any of steps 301-305, 401-405 may be performed by a user's mobile device 215 or 225 within the vehicles 210 or 220. These mobile devices 215 or 225, or another computing device 230, may execute software configured to perform similar functionality in place of the driving analysis computers 214 and 224. Additionally, some or all of the driving analysis functionality described in reference to FIGS. 3, 4, and 5 may be performed by a driving analysis computer 251 at a non-vehicle based driving analysis server 250. For example, vehicles 210 and 220 may be configured to transmit their own vehicle sensor data, and/or the V2V communications data received from other nearby vehicles, to a central driving analysis server 250 via telematics devices 213 and 223.

While systems already exist for autonomous vehicles, such as the self-driving car by GOOGLE™, the spirit of this disclosure is not limited to just autonomous self-driving cars. For example, the vehicle 220 may be a completely autonomous vehicle, semi-autonomous vehicle, or a manual human-driven vehicle. Depending on the capabilities of the vehicle 220, the vehicle may be equipped with the appropriate sensors 221 and other electronic components to enable the automation/semi-automation, as is already known in the relevant art of autonomous/semi-autonomous vehicles. Similarly, an autonomous drone vehicle may be equipped with the appropriate hardware and software to operate as an autonomous vehicle, semi-autonomous vehicle, or a manually-driven vehicle. In contrast, however, in some examples, an autonomous drone vehicle may be equipped with less hardware and/or software than a vehicle with complete autonomous capability because to some extent, the a drone vehicle may rely upon the lead vehicle to provide guidance and commands for controlling the speed, acceleration, braking, cornering, route, and other operation of the following vehicle. For example, a following drone vehicle may transmit data to the lead vehicle using its short-range wireless communications system, and rely upon long-range wireless communication capabilities of the lead vehicle to forward the data to the appropriate final destination. At least one benefit of such an arrangement is that the cost/price of a following drone vehicle may be less than that of other vehicles (e.g., lead vehicle) due to reduced complexity and reduce hardware and/or software requirements. In an embodiment, an autonomous driving system quality rating takes into account whether a vehicle is equipped for autonomous droning.

In addition, the integrity of collected vehicle driving data may be validated by comparing, e.g., by a driving analysis computer, the driving data (e.g., location, speed, direction) from one vehicle's sensors 211 with corresponding driving data from a nearby vehicle 220. In one example, driving data of the nearby vehicle can be collected by a data acquiring component of a following/drone vehicle 210 via, for example, vehicle V2V. In one example, the driving data of the nearby vehicle may be directly received from the nearby vehicle.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. In addition, where reference has been made in this disclosure to items in the figures, in some instances the alphabetic suffix (e.g., "A" or "B") of a reference number has been omitted when it is desired to generally reference (e.g., "226") the item without specificity as to which of the plurality of items corresponding to the same base reference number.

What is claimed is:

1. A driving analysis computing device comprising:
   one or more processors;
   and
   memory storing instructions that, when executed by the one or more processors, cause the driving analysis computing device to:
   receive, from at least one environment data acquiring component through vehicle-to-vehicle communication or vehicle-to-infrastructure communication, environment data associated with one or more locations of a vehicle when the vehicle was engaged in at least semi-autonomous driving;
   determine, based on the environment data, an autonomous driving risk factor;
   determine that the vehicle is not engaged in autonomous driving;
   determine, based on the autonomous driving risk factor, a coverage attribute that is higher for manual driving in a current environment condition based on the environment data than at least semi-autonomous driving in the current environment condition;
   send a notification to a device associated with a driver of the vehicle of a difference between the attribute for manual driving in the current environment condition based on the environment data than at least semi-autonomous driving in the current environment condition to encourage the driver to engage the vehicle in at least semi-autonomous driving;
   determine that the driver has, in response to the notification, engaged the vehicle in at least semi-autonomous driving; and
   cause a change in a coverage amount of the coverage attribute in response to the determination that the vehicle has engaged in at least semi-autonomous driving.

2. The driving analysis computing device of claim 1, wherein the instructions, when executed by the one or more processors, further cause the driving analysis computing device to cause display of a cost savings based on determining that the vehicle is not engaged in at least semi-autonomous driving.

3. The driving analysis computing device of claim 1, wherein the instructions, when executed by the one or more processors, further cause the driving analysis computing device to:
   receive, from a second vehicle, second vehicle operational data corresponding to the second vehicle, wherein the instructions, when executed by the one or more processors, further cause the driving analysis computing device to determine the autonomous driving risk factor based on the second vehicle operational data.

4. The driving analysis computing device of claim 1, wherein the instructions, when executed by the one or more processors, further cause the driving analysis computing device to:
receive, from a second vehicle, environmental data that indicates a level of traffic corresponding to a route of the vehicle, wherein the instructions, when executed by the one or more processors, further cause the driving analysis computing device to determine the autonomous driving risk factor further based on the level of traffic.

5. The driving analysis computing device of claim 1, wherein the instructions, when executed by the one or more processors, further cause the driving analysis computing device to:
determine the one or more locations of the vehicle.

6. The driving analysis computing device of claim 1, wherein the instructions, when executed by the one or more processors, further cause the driving analysis computing device to determine the autonomous driving risk factor by causing the driving analysis computing device to:
determine, based on the environment data, a risk factor associated with manual driving.

7. The driving analysis computing device of claim 1, wherein the environment data indicates a visibility of one or more objects around the vehicle.

8. A computer-implemented method comprising:
receiving, from at least one environment data acquiring component through vehicle-to-vehicle communication or vehicle-to-infrastructure communication, environment data associated with one or more locations of a vehicle when the vehicle was engaged in at least semi-autonomous driving;
determining, based on the environment data, an autonomous driving risk factor;
determining that the vehicle is not engaged in at least semi-autonomous driving;
determining, based on the autonomous driving risk factor, a coverage attribute that is higher for manual driving in a current environment condition based on the environment data than autonomous driving in the current environment condition;
sending a notification to a device associated with a driver of the vehicle of a difference between the attribute for manual driving in the current environment condition based on the environment data than at least semi-autonomous driving in the current environment condition to encourage the driver to engage the vehicle in at least semi-autonomous driving;
determining that the driver has, in response to the notification, engaged the vehicle in at least semi-autonomous driving; and
causing a change in a coverage amount of the coverage attribute in response to the determination that the vehicle has engaged in at least semi-autonomous driving.

9. The method of claim 8, wherein causing display of a cost savings is based on determining that the vehicle is not engaged in at least semi-autonomous driving.

10. The method of claim 8, further comprising:
receiving, from a second vehicle, second vehicle operational data corresponding to the second vehicle, wherein the determining the autonomous driving risk factor based on the second vehicle operational data.

11. The method of claim 8, further comprising:
receiving, from a second vehicle, environmental data that indicates a level of traffic corresponding to a route of the vehicle, wherein the determining the autonomous driving risk factor is further based on the level of traffic.

12. The method of claim 8, further comprising:
determining the one or more locations of the vehicle.

13. The method of claim 8, wherein determining the driving risk factor comprises:
determining, based on the environment data, a risk factor associated with manual driving.

14. The method of claim 8, wherein the environment data indicates a visibility of one or more objects around the vehicle.

15. One or more non-transitory computer-readable media storing instructions that, when executed, cause:
receiving, from at least one environment data acquiring component through vehicle-to-vehicle communication or vehicle-to-infrastructure communication, environment data associated with one or more locations of a vehicle when the vehicle was engaged in at least semi-autonomous driving;
determining, based on the environment data, an autonomous driving risk factor;
determining that the vehicle is not engaged in at least semi-autonomous driving;
determining, based on the autonomous driving risk factor, a coverage attribute that is higher for manual driving in a current environment condition based on the environment data than autonomous driving in the current environment condition;
sending a notification to a device associated with a driver of the vehicle of a difference between the attribute for manual driving in the current environment condition based on the environment data than at least semi-autonomous driving in the current environment condition to encourage the driver to engage the vehicle in at least semi-autonomous driving;
determining that the driver has, in response to the notification, engaged the vehicle in at least semi-autonomous driving; and
causing a change in a coverage amount of the coverage attribute in response to the determination that the vehicle has engaged in at least semi-autonomous driving.

16. The non-transitory computer-readable media of claim 15, wherein the instructions, when executed, further cause display of a cost savings based on determining that the vehicle is not engaged in at least semi-autonomous driving.

17. The non-transitory computer-readable media of claim 15, wherein the instructions, when executed, further cause:
receiving, from a second vehicle, second vehicle operational data corresponding to the second vehicle, wherein the instructions, when executed, cause the determining the driving risk factor based on the second vehicle operational data.

18. The non-transitory computer-readable media of claim 15, wherein the instructions, when executed, further cause:
receiving, from a second vehicle, environmental data that indicates a level of traffic corresponding to a route of the vehicle, wherein the instructions, when executed, cause the determining the autonomous driving risk factor further based on the level of traffic.

19. The non-transitory computer-readable media of claim 15, the instructions, when executed, further cause:
determining the one or more locations of the vehicle.

20. The non-transitory computer-readable media of claim 15, wherein the instructions, when executed, further cause determining the autonomous driving risk factor by causing:
  determining, based on the environment data, a risk factor associated with manual driving.

* * * * *